US012798312B2

(12) United States Patent
Peitz

(10) Patent No.: US 12,798,312 B2
(45) Date of Patent: Nov. 17, 2026

(54) SENSOR APPARATUS HAVING AN ADJUSTMENT DEVICE

(71) Applicant: Westfalia-Automotive GmbH, Rheda-Wiedenbrück (DE)

(72) Inventor: Jürgen Peitz, Langenberg (DE)

(73) Assignee: WESTFALIA-AUTOMOTIVE GmbH, Rheda-Wiedenbruck (DE)

(*) Notice: Subject to any disclaimer, the term of this patent is extended or adjusted under 35 U.S.C. 154(b) by 554 days.

(21) Appl. No.: 18/037,821

(22) PCT Filed: Dec. 6, 2021

(86) PCT No.: PCT/EP2021/084406
§ 371 (c)(1),
(2) Date: May 22, 2023

(87) PCT Pub. No.: WO2022/122657
PCT Pub. Date: Jun. 16, 2022

(65) Prior Publication Data

US 2023/0415531 A1 Dec. 28, 2023

(30) Foreign Application Priority Data

Dec. 9, 2020 (DE) ..................... 10 2020 132 888.5
Mar. 8, 2021 (DE) ..................... 10 2021 105 517.2

(51) Int. Cl.
*B60D 1/62* (2006.01)
*B62D 53/08* (2006.01)

(52) U.S. Cl.
CPC ............... *B60D 1/62* (2013.01); *B62D 53/08* (2013.01); *B60Y 2400/301* (2013.01)

(58) Field of Classification Search
CPC .......... B60D 1/62; B60D 1/015; B62D 53/08; B60Y 2400/301
See application file for complete search history.

(56) References Cited

U.S. PATENT DOCUMENTS 6,302,547 B1 10/2001 Valentino
2021/0078653 A1* 3/2021 Hartmann ............ B62D 53/125
(Continued)

FOREIGN PATENT DOCUMENTS

DE 600 12 528 T2 7/2005
DE 10 2010 010 242 A1 6/2011
(Continued)

OTHER PUBLICATIONS

International Search Report.
German Examination Report.

*Primary Examiner* — Kevin Hurley
*Assistant Examiner* — Marlon A Arce
(74) *Attorney, Agent, or Firm* — DAY PITNEY LLP; George N. Chaclas; Joseph P. Quinn

(57) ABSTRACT

A sensor apparatus for a towing vehicle coupling, by means of which a trailer vehicle can be coupled to a towing vehicle, wherein the towing vehicle coupling has a coupling element for the releasable coupling of a mating coupling element, which elements are or can be fastened to the towing vehicle and the trailer vehicle and, in the mutually coupled state, forming a coupling joint, can be rotated about a coupling joint rotational axis relative to one another, wherein the sensor apparatus has a driver which is mounted on a driver mounting device so as to be rotatable about a drive rotational axis relative to the coupling element and which can be rotationally driven about the drive rotational axis by the mating coupling element upon rotation about the coupling joint rotational axis in order to record a rotation of the mating coupling element about the coupling joint rotational axis relative to the coupling element, and wherein the sensor apparatus has a sensor for recording a particular rotational position of the driver.

32 Claims, 6 Drawing Sheets

(56) References Cited

U.S. PATENT DOCUMENTS

| | | | | |
|---|---|---|---|---|
| 2021/0206217 | A1 | 7/2021 | Angermann et al. | |
| 2021/0229511 | A1* | 7/2021 | Farquer | B60D 1/249 |
| 2021/0379941 | A1 | 12/2021 | Peitz et al. | |
| 2024/0067278 | A1* | 2/2024 | Javidan | B60D 1/06 |
| 2024/0067280 | A1* | 2/2024 | Müller | B60D 1/015 |
| 2024/0083527 | A1* | 3/2024 | Müller | B60D 1/36 |
| 2024/0420367 | A1* | 12/2024 | Müller | G06T 7/73 |
| 2025/0018755 | A1* | 1/2025 | Ricke | B60D 1/28 |

FOREIGN PATENT DOCUMENTS

| | | | | |
|---|---|---|---|---|
| DE | 102010010242 | * | 6/2011 | B60D 1/06 |
| DE | 10 2018 123 642 | A1 | 3/2020 | |
| WO | 2020/007903 | A1 | 1/2020 | |
| WO | 2020/064391 | A1 | 4/2020 | |

* cited by examiner

SENSOR APPARATUS HAVING AN ADJUSTMENT DEVICE

This application is a National Stage application based on International Application No. PCT/EP2021/084406, filed Dec. 6, 2021, which claims priority to DE 102020132888.5, filed Dec. 9, 2020 and DE 102021105517.2, filed Mar. 8, 2021.

BACKGROUND OF THE INVENTION

The invention relates to a sensor apparatus for a towing vehicle coupling or as a component of a towing vehicle coupling, by means of which a trailer vehicle, in particular a semitrailer, can be coupled to a towing vehicle, in particular a lorry, wherein the towing vehicle coupling has a coupling element for the releasable coupling of a mating coupling element, which elements are or can be fastened to the towing vehicle and to the trailer vehicle and, in the mutually coupled state, forming a coupling joint, can be rotates about a coupling joint rotational axis relative to one another, wherein the sensor apparatus has a driver which is mounted on a driver mounting device so as to be rotatable about a drive rotational axis relative to the coupling element and which can be rotationally driven about the drive rotational axis by the mating coupling element upon rotation about the at least one coupling joint rotational axis in order to detect a rotation of the mating coupling element about the at least one coupling joint rotational axis relative to the coupling element, and wherein the sensor apparatus has a sensor for detecting a particular rotational position of the driver relative to the driver mounting device with respect to the drive rotational axis, and wherein the sensor apparatus has a retaining device for retaining the driver mounting device with respect to the coupling element so as to be non-rotatable with respect to the drive rotational axis.

The sensor apparatus has an adjustment device with at least one adjustment element for adjusting and/or guiding the driver between a working position set closer to the mating coupling element and provided for rotationally driving the driver and an idle position farther away from the mating coupling element.

Such a sensor apparatus is described in WO 2020/064391 A1, for example. The adjustment device comprises, among other components, a pulling element permanently joined to the retaining device for moving the retaining device and thus the driver located at the retaining device from the working position into the idle position. The kinematics are complex.

The present invention is therefore based on the problem of providing an improved sensor apparatus.

SUMMARY OF THE INVENTION

To solve the problem, it is provided in a sensor apparatus of the type mentioned at the beginning that the adjustment device is not in engagement with the retaining device in the working position, so that the retaining device can be moved relative to the coupling element with at least one degree of freedom of movement which is different from the rotatability about the drive rotational axis and is suitable for providing or maintaining the drive coupling of the driver with the mating coupling element.

To solve the problem, a towing vehicle coupling with such a sensor apparatus is furthermore provided.

The contact between the adjustment device on the one hand and the retaining device on the other hand is therefore broken in the working position, so that, although the retaining device can hold the driver mounting device non-rotatably with respect to the driver rotational axis, it does not otherwise impede a mobility of the driver mounting device. The driver can therefore participate in movements of the mating coupling element as it were and remain in surface contact with the mating coupling element by way of its front side.

The adjustment device is preferably out of engagement with the retaining device to such an extent that the towing vehicle coupling can be used if the driver is deflected in a travel mode within the above mentioned degrees of freedom of movement. If the towing vehicle coupling is not in use and/or the mating coupling element is not in contact with the driver, it is conceivable that the retaining device or the adjustment body comes into touch contact with the adjustment device, for example hitting it. An operator could for example correspondingly deflect the thus freely accessible driver, which would not be possible with a coupled trailer coupling, however.

It is therefore possible that the retaining device and the adjustment device can come into engagement or contact in the working position as well, for example if the driver is deflected to a degree which is not possible by actuating the driver by the coupling element.

It is preferred if all components of the adjustment device are out of engagement with the retaining device in the working position.

All drive components required for moving the retaining device from the working position into the idle position are advantageously out of engagement with the support in the working position of the driver. A pulling element for moving or pulling the driver from the working position into the idle position is therefore out of engagement with the driver mounting device, for example.

The driver is preferably arranged to be incapable of linear displacement with respect to the driver mounting device, in particular with respect to the drive rotational axis, but rotatable about the drive rotational axis. It is advantageously provided that the driver is exclusively mounted rotatably at the driver mounting device.

It is advantageously provided that the driver is located outside a mounting region of the coupling joint where the coupling element and the mating coupling element are in mounting engagement with each other.

In the working direction the adjustment device does not act on the driver and/or the driver mounting device and/or the retaining device for the purpose of support or force application.

It is obviously possible that the adjustment device does not only move and/or guide the driver between the working position and the idle position, but also the driver mounting device and/or the retaining device. In this it is possible that the adjustment device is suitable and/or provided only for movement or guidance from the idle position into the working position or from the working position into the idle position, or for both.

The adjustment device can furthermore not only move the driver as such between the working position and the idle position, but also the driver mounting device and possibly a sensor module comprising both the driver mounting device and the driver body and the sensor.

It is preferred if the driver is in contact with the mating coupling element in the working position and out of contact with the mating coupling element in the idle position. It is also possible, however, that the driver is subjected to a lower force towards the mating coupling element in the idle position than in the working position. Even then it is possible that coupling element and mating coupling element can be brought out of or into engagement more easily than when the driver is still in the working position.

The mechanical loading of the driver is advantageously reduced, for example during a coupling process between the trailer vehicle and the towing vehicle, if the driver is held in the idle position by the adjustment device during the coupling process.

It is advantageous if the driver is mounted movably with respect to the coupling element for providing or maintaining the drive coupling to the mating coupling element by the retaining device with at least one degree of freedom of movement which is different from the rotatability about the drive rotational axis, advantageously with several degrees of freedom of movement which are different from the rotatability about the drive rotational axis. The driver mounting device itself is, with respect to the coupling element, held non-rotatably by the retaining device with respect to the drive rotational axis. At the drive rotational axis, on the other hand, the driver is mounted so as to be movable about the drive rotational axis. The retaining device has a support, for example, in particular a support plate, for the driver mounting device.

It is advantageously provided that the at least one degree of freedom of movement which is different from the rotatability about the drive rotational axis comprises at least one degree of freedom of rotation and at least one degree of freedom of linear movement or degree of freedom of displacement.

It is advantageous if a displacement axis of the degree of freedom of displacement and a pivot axis of the at least one degree of freedom of rotation intersect each other.

In this it is a fundamental idea that the driver is not only mounted rotatably about the drive rotational axis with respect to the coupling element by means of the driver mounting device, but also by means of the retaining device with one or more degree(s) of freedom of movement which differ from the rotatability about the drive rotational axis or the degree of freedom of rotation about the drive rotational axis. As a result the driver can, as it were, be brought into contact or drive coupling with the mating coupling element, for example a ball coupling, in a floating manner. It is advantageously provided that the driver mounting device is mounted in a floating manner and/or with at least two degrees of freedom of movement with respect to the coupling element of the towing vehicle coupling, with the exception of rotatability about the drive rotational axis.

It can be provided that the retaining device mounts the driver displaceably with respect to the coupling element along at least one displacement axis or linear axis, for example along a linear axis or displacement axis which is coaxial with or parallel to the drive rotational axis.

The at least one degree of freedom of movement for the provision of the drive coupling or the maintenance thereof advantageously comprises at least one degree of freedom of linear movement. The driver can therefore for example be mounted by means of the retaining device at the coupling element or with respect to the coupling element so as to be movable towards the mating coupling element or away therefrom with respect to or parallel to the drive rotational axis. The displacement axis expediently extends parallel or at an angle of less than 90° to the drive rotational axis. The linear displacement axis can also be pivotable about a rotational axis or pivot axis within the at least one degree of freedom of movement.

The at least one degree of freedom of movement of the driver for providing or maintaining the drive coupling to the mating coupling element expediently comprises or is represented by at least one degree of freedom of rotation for rotating the driver about at least one rotational axis extending at an angle, for example a right angle, to the drive rotational axis. It is preferred if two degrees of freedom of rotation are provided which are different from the drive degree of freedom of rotation and serve as degrees of freedom of movement for providing or maintaining the drive coupling of the driver with the mating coupling element.

For mounting the driver with respect to the degree of freedom of movement which differs from the rotatability about the drive rotational axis, the retaining device has a mounting device for movably mounting a support at which the driver mounting device is located. The mounting device is located in a stationary fashion at the towing vehicle coupling, for example, and provided and designed for stationary location at the towing vehicle coupling. Bearing surfaces of the mounting device are advantageously always in contact with each other in the manner of bearing surfaces or contact surfaces of a plain bearing or a roller bearing. The mounting device mounts the support non-rotatably with respect to the drive rotational axis relative to the coupling element.

The mounting device advantageously comprises at least one sliding bearing and/or swivel bearing.

The sliding bearing preferably has anti-rotation contours in such a way that parts of the sliding bearing, although being displaceable relative to one another with respect to the sliding axis, are held to one another so as to be non-rotatable about the sliding axis.

A configuration in which a sliding bearing is integrated into a swivel bearing is preferred, i.e. that a sliding bearing element is for example accommodated slidably in a swivel bearing element, which is in turn pivotably mounted at a swivel bearing receptacle. The swivel bearing receptacle can be stationary with respect to the coupling element. It is also possible, however, that the sliding bearing element is stationary with respect to the coupling element and the swivel bearing receptacle is located at a body at which the driver is mounted so as to be rotatable about the drive rotational axis, for example at a support of a retaining device yet to be described, of the driver mounting device or the like.

The at least one swivel bearing of the mounting device comprises a ball bearing and/or a gimballed bearing or gimbal bearing. The ball joint is preferably mounted non-rotatably at the coupling element with respect to the drive rotational axis or with respect to the coupling element. All pivot axes of the swivel bearing of the mounting device preferably extend transversely to the drive rotational axis.

The sensor apparatus preferably has a spring assembly for providing a spring force acting on the driver in the direction of the mating coupling element. The spring assembly can comprise one or more springs, in particular metallic springs, coil springs, helical springs of the like. The spring assembly can also comprise or be represented by one or more Belleville springs, in particular a Belleville spring package, leg springs or the like. The spring assembly preferably comprises or is represented by one or more compression springs. The spring assembly acts on the retaining device in particular and/or forms a part of the retaining device.

The spring force can also be provided or supported wholly or partially by a certain elasticity of the driver body of the driver, however.

A combination of springs which are separate from the driver, in particularly metallic springs, spring buffers or the like, with an elastic or spring-elastic driver body of the driver is readily possible.

The spring assembly is preferably separate from the adjustment device. It is furthermore advantageous if the spring assembly does not act directly on a component of the adjustment device. The spring assembly can for example act on the retaining device, which is in turn supported and/or guided at the adjustment device, so that the spring assembly acts on the adjustment device by way of the retaining device and thus indirectly. An advantageous variant of the invention in any case provides that the spring assembly acts on the retaining device, in particular only on the retaining device and/or directly on the retaining device.

At this point it should be mentioned that the driver advantageously has at least one elastic section for elastic deformation by the mating coupling element. As a result a force can be applied by a spring, a magnet or the like, for example, towards the mating coupling element. The elastic section then yields. The driver is thus advantageously elastically deformable or at least partially elastically deformable by the mating coupling element.

It is furthermore advantageous if the sensor apparatus has a magnet assembly for providing a magnetic force of attraction acting on the driver towards the mating coupling element. The magnet assembly can comprise one or more magnets, which interact with the intrinsically ferromagnetic mating coupling element, for example. It can be provided that the driver, when the sensor apparatus is used, i.e. in the operating state, is held at the mating coupling element exclusively or at least substantially by the at least one magnet. In addition, the driver mounting device is advantageously held at the mating coupling element by the magnet as well. The sensor is also advantageously held at the mating coupling element by the magnet. A unit comprising the sensor and the driver is therefore held at the mating coupling element by the magnet.

The magnet assembly can comprise at least one permanent magnet and/or electro-magnetically acting magnet. The magnet assembly comprises one or more electric coils, for example.

The magnet assembly can have one or more flux guide elements for directing the magnetic flux generated by a permanent magnet or solenoid of the magnet assembly. Such a flux guide element, in particular a soft-magnetic flux guide element, is for example designed and provided to direct or guide the magnetic flux towards the mating coupling element. The flux guide element is for example suitable for increasing or orienting a force of attraction of the driver towards the mating coupling element.

The magnet assembly can be designed or arranged for actuating and exciting the at least one sensor. The magnet assembly is therefore used for two purposes, i.e. on the one hand for generating the force of attraction towards the mating coupling element, but on the other hand also for exciting and actuating the at least one sensor.

It is furthermore also possible, however, that the magnet assembly has a shielding device for shielding the at least one sensor against magnetic influences of the magnet assembly. The magnetic field of the magnet assembly can thus be directed away from the sensor or around the sensor. At this point it should be mentioned, however, that a combination of magnetic screening and magnetic actuation of the sensor is possible as well. In this way the magnetic flux or the magnetic field of the magnet assembly can be guided around a sub-region of the sensor, for example, in order to avoid erroneous actuation, wherein the magnetic field is nevertheless oriented towards the sensor, but to another point.

An advantageous embodiment provides that the adjustment device has or forms an actuator for moving the driver between the working position and the idle position. The at least one adjustment element then forms a drive element, for example. The actuator can move the driver towards the working position and/or towards the idle position. It is also possible that the driver and/or the retaining device are loaded towards the working position by a spring assembly and the actuator forms a resetting drive for movement towards the idle position.

It is advantageously provided that the adjustment device has a guide, in particular a positive guide, which guides the driver along a predetermined adjustment path when moving between the working position and the idle position. Guidance is preferably present until the working position and/or the idle position is reached. It is thus in any case ensured that the driver is always guided and/or driven by the adjustment device between the working position and the idle position.

A preferred exemplary embodiment provides that the sensor apparatus has at least one adjustment body connected to the driver or the retaining device, with which adjustment body an adjustment contour of the at least one adjustment element of the adjustment device is in guide engagement and/or drive engagement to move the driver between the working position and the idle position. The at least one adjustment body is a drive projection or a guide projection, for example, which projects in front of the support explained below, for example. If the adjustment body is described in the following description, this description relates to one or more adjustment bodies. A single adjustment body can therefore be provided. Several, e.g. two, three or further, adjustment bodies can be provided as well, however.

The at least one adjustment body advantageously projects in front of a support, for example radially with respect to an adjustment path or adjustment axis along which the support is movable between the idle position and the working position, the support carrying the driver mounting device. The support forms a part of the retaining device, for example.

At least two, preferably three, adjustment bodies are preferably provided, which have an angular distance from one another. Each of the adjustment bodies is in engagement with an adjustment contour of an adjustment element of the adjustment device when moving between the idle position and the working position. An angular distance between two adjustment bodes is preferably at least 30°, in particular at least 40° or 50°. If only two adjustment bodes are present, for example, the angular distance is preferably at least 90°, in particular at least 120° and, particularly preferred, at least 130°.

It is preferred if the sensor apparatus has two, in particular precisely two, or three, in particular precisely three, adjustment bodies, each of which is in engagement with an adjustment contour of the at least one adjustment element of the adjustment device in such a way that the driver is non-pivotably supported at the at least one adjustment element with respect to an adjustment path or adjustment axis along which the driver is movable and/or guidable between the working position and the idle position by means of the adjustment device. The adjustment contours and adjustment bodies are in particular arranged in such a way that a straight guidance or a guidance along a linear axis is realised. The adjustment bodies for example project laterally with mutual angular spacing in front of the support at which the driver mounting device is located. As a result of the support at at least two, in particular two or three, points with mutual angular spacing, the driver, although being movable along the adjustment axis or adjustment path, does not tilt.

The adjustment axis is in particular parallel to or inclined at an angle of maximally 10°, in particular maximally 5°, to the drive rotational axis.

A preferred concept provides that the at least one adjustment element is, for the adjustment and/or guidance of the at least one adjustment body, mounted movably, in particular rotatably, at an adjustment element bearing which is stationary with respect to the coupling element or provided for stationary location with respect to the coupling element, so that the adjustment contour is moved past the adjustment body at an adjustment of the adjustment element, sliding along in particular. The adjustment contour thus forms a drive contour, for example. The adjustment body is in turn held non-rotatably with respect to the drive rotational axis, for example by the retaining device, so that the adjustment contour can slide past the adjustment body.

The adjustment element bearing for example comprises a floating bearing of an in particular sleeve-shaped adjustment element. The adjustment element bearing may also comprise a rolling bearing, for example, in particular a ball bearing and particularly preferably a grooved ball bearing. It is also possible, however, that an e.g. sleeve-shaped or tubular adjustment element is installed in an anti-friction bushing forming the adjustment element bearing.

If several adjustment elements are provided, for example two adjustment element, it is advantageous if one adjustment element is mounted at the other adjustment element. In this a sliding mounting, in particular a sliding coating, between the adjustment elements is advantageous. In this way the one adjustment element can be bearing-mounted by means of the adjustment element bearing and form a bearing for the other adjustment element. The one adjustment element can for example be designed as a sleeve which is bearing-mounted by means of the adjustment element bearing and rotatably mounts the other adjustment element, which is likewise designed as a sleeve, for example in its interior or at its outer circumference.

It is preferred if the at least one adjustment element is mounted at an adjustment element bearing which is stationary with respect to the coupling element or provided for stationary location with respect to the coupling element so as to be rotatable about an axis which is coaxial with or parallel to the drive rotational axis or inclined at an angle of maximally 10°, preferably maximally 5°, to the drive rotational axis, and/or extends in an annular fashion about said axis. Alternatively, it is readily possible that the adjustment element(s) of the adjustment device is or are mounted displaceably with respect to the coupling element, in particular along a linear axis, by means of a sliding bearing.

A pivoting angle about which the at least one adjustment element pivots between a position assigned to the idle position and a position assigned to the working position is maximally 10° to 180°, preferably 15° to 60°, for example.

It is preferred if the adjustment contour of the at least one adjustment element extends perpendicularly to an adjustment axis along or about which the adjustment element is adjustable, e.g. displaceable or rotatable.

It is advantageous if the adjustment contour is designed as a link, in particular a guide link and/or a drive link and/or a sliding link.

The at least one adjustment body can be permanently joined to the retaining device or motion-coupled thereto with respect to a degree of freedom of movement required for moving the driver into the idle position. It is thus for example possible that the at least one adjustment body is joined to the retaining device with motoric play.

The at least one adjustment contour can have various functions, e.g. the function of a guide contour and/or a drive contour.

The at least one adjustment body can bear against the adjustment contour with only one side. It is also possible, however, that the at least one adjustment body is guided and/or driven or can be driven between mutually opposite adjustment contours designed in the manner of a groove, in particular a guide groove or drive groove, a slot or the like, for example. Mutually opposite guide contours or adjustment contours or drive contours can also be provided in sections at the adjustment element, i.e. the at least one adjustment body is for example only supported on one side by an adjustment contour of the adjustment element during a first movement section, while being supported on mutually opposite sides by the adjustment contour(s) in a second movement section.

It is preferred if the at least one adjustment contour has or forms a resetting contour for moving the driver from the working position into the idle position and/or a drive contour for moving the driver from the idle position into the working position.

It is advantageously provided that the adjustment device has a movement recess with which the at least one adjustment body of the retaining device engages freely with the degree of freedom of movement provided for drive coupling with the mating coupling element in a position of the at least one adjustment element which is assigned to the working position. The movement recess makes it possible for the at least one adjustment body and thus for the driver to move with the above-mentioned degree of freedom of movement.

The movement recess is for example located at the adjustment element adjacent to the adjustment contour. Between the movement recess and the adjustment contour, a lead-in chamfer or an inclined surface can be provided for guiding the adjustment body in the direction of the adjustment contour, for example.

It is preferably provided that the at least one adjustment element is movable, when the driver is in the working position, between a release position in which the at least one adjustment body is out of engagement with the adjustment contour, engaging in particular with the or a movement recess adjacent to the adjustment contour, and an engagement position in which the at least one adjustment body is in engagement with the adjustment contour. The adjustment element can for example guide and/or drive the driver into the working position by means of the at least one adjustment body and then continue to be moved until the at least one adjustment body enters the movement recess. In the release position the at least one adjustment body is freely movable with the degree of freedom of movement provided for drive coupling with the mating coupling element.

It is advantageously provided that the at least one adjustment element has an idle position holding receptacle, in which the at least one adjustment body is held in a stationary manner at the adjustment element in a position assigned to the idle position of the driver, and/or that it has an idle position stop, which the at least one adjustment body hits in a position assigned to the idle position of the driver. The at least one adjustment body and the driver connected to the adjustment body are thus held in the idle position holding receptacle in the idle position.

The inventive concept can readily be realised with a single adjustment element. The at least one adjustment body can for example engage with a guide link, provided as an adjustment contour, of an adjustment element of the adjustment device for guidance and/or driving between the working position and the idle position of the driver. The guide link can be designed as a guide groove, for example, while the at least one adjustment body forms the link-motion follower.

It is preferably provided that the adjustment device has two adjustment elements with an adjustment contour each, which are movable relative to each other, in particular rotatable and/or displaceable relative to each other, with which adjustment elements the at least one adjustment body is in guide engagement and/or drive engagement for moving between the working position and the idle position. In this it should be noted that further adjustment elements are obviously possible, i.e. that three or four adjustment elements with at least one adjustment contour each interact with the adjustment body.

The adjustment contours can be arranged consecutively one behind the other, for example, or the at least one adjustment body can come into engagement with the adjustment contours consecutively. It is preferred, however, if the adjustment contours are simultaneously in engagement with the at least one adjustment body. In this it is possible that the adjustment body is only in engagement with the adjustment contours of the two adjustment elements over a movement section when moving between the idle position and the working position, while the adjustment body is in engagement with only one of the adjustment contours over another movement section of the movement between idle position and working position. Advantageously, however, the adjustment body is in engagement with both adjustment contours during the entire movement between the idle position and the working position.

It is advantageously provided that the adjustment contours are designed for adjustment and/or guidance of the adjustment body along an adjustment path, in particular an adjustment axis, by adjusting the adjustment element transversely to the adjustment path, wherein inclinations of the adjustment contours are designed such that the adjustment body supported at the adjustment contours is immovable transversely to the adjustment path. The adjustment elements can for example be actuated to rotate about a rotational axis in order to move or guide the adjustment body along an adjustment path or adjustment axis which is parallel to or inclined relative to the rotational axis.

The adjustment contours of the at least two adjustment elements can work together as follows, for example:

It is preferably provided that the at least one adjustment body engages between the adjustment contours and/or that the adjustment contours have mutually opposite adjustment sections. The one adjustment contour can for example actuate the adjustment body towards the other adjustment contour or apply force to it, so that the adjustment body remains or is held in engagement with both adjustment contours.

It is preferably provided that the adjustment contours, at the relative adjustment of the adjustment elements, form a holding receptacle for holding the adjustment body, with which the adjustment body engages and which is movable between a position assigned to the working position and a position assigned to the idle position by the relative adjustment of the adjustment elements along an in particular straight or substantially straight adjustment path.

An advantageous exemplary embodiment provides that the adjustment elements have idle position stops, between which the adjustment body is held stationary in a position assigned to the idle position of the driver. The idle position stops can form parts of an idle position receptacle each for the adjustment body, for example. The adjustment body can have a motoric play between the idle position stops and/or within the idle position receptacles, but is held in the position assigned to the idle position of the driver by the idle position stops or the idle position receptacles.

It is advantageously provided that at least one adjustment element has a through-opening through which the adjustment body is or can come into engagement with an adjustment contour of an or the further adjustment element located at the at least one adjustment element.

It is readily possible that the adjustment device has a motoric and/or manual actuating drive. It is particularly preferred if the adjustment device has an in particular electric drive motor for driving the at least one adjustment element. The drive motor forms an actuating drive for the adjustment device, for example.

If several adjustment elements are provided, these can for example be driven by individual drives or drive motors.

The adjustment device advantageously comprises or forms an actuator. The actuator comprises the at least one adjustment element, for example.

To actuate the at least one adjustment element, a motoric actuating drive with an in particular electric drive motor is preferably provided. The actuating drive can form a part of the adjustment device.

The actuator can advantageously be activated to adjust the driver by a control device, for example by means of the actuating drive or by way of an activation of the actuating drive. The sensor apparatus advantageously has a control device for its activation, in particular a control device for activating the drive motor.

It is preferred if the control device for activating the actuator and/or the actuating drive is designed such that the actuator moves the driver between the idle position and the working position if the coupling element is in engagement with the mating coupling element, e.g. coupled to or into the latter. In this way a king pin can initially be inserted into a corresponding receptacle, for example, before the actuator moves the driver from the idle position into the working position. Vice versa it is also advantageous if the driver is moved from the working position into the idle position while the coupling element is still in engagement with the mating coupling element, i.e. there still is a coupling.

The actuator comprises an electric drive motor, for example. A fluid drive, e.g. a pneumatic drive, a spring drive or the like or a combination thereof is readily possible as well, however. There may for example be a pneumatic drive with integrated spring which loads the driver or the driver mounting device constantly towards the working position. By actuation with compressed air or another fluid, the pneumatic drive can be actuable from the working position into the idle position. The drive motor can drive the adjustment device directly or have a gear mechanism, e.g. a planetary gear train, via which the drive motor drives the adjustment device. The drive motor and the gear mechanism form a drive unit, for example.

The control device can be a mechanical control device. Mechanical actuation can therefore be provided for triggering the actuator.

The control device can also comprise or be represented by an electric control device for actuating the actuator, however. A combination of mechanical activation and/or actuation by the mating coupling element and/or an electric control is obviously possible.

The control device expediently comprises at least one sensor, e.g. an optical sensor, a tactile sensor, a capacitive sensor or the like, the control device activating the actuator, in particular the actuating drive, by means of a sensor signal of the at least one sensor.

The sensor can thus for example be provided for the detection of a relative position of the mating coupling element with respect to the coupling element. If the coupling element and the mating coupling element are in engagement, this can be detected by the sensor, whereby the control device is activated to activate the actuator.

It is furthermore possible that the sensor is designed for the detection of a position of a locking device of the towing vehicle coupling. The sensor can then for example activate the actuator for moving from the idle position into the working position when the locking device is moved into the locking position. If the locking device of the towing vehicle coupling is released, however, it activates the actuator for moving from the working position into the idle position.

The sensor can be designed for the detection of a position of an actuating element of the locking device, for example of an actuating lever. With the actuating element the locking device can be moved between the locking position locking the mating coupling element and a release position provided for uncoupling and releasing the mating coupling element. The actuating element is an operating lever of the towing vehicle coupling, for example, and is located at a so-called fifth wheel plate, for example.

It is also possible, however, that at least one sensor directly detects the position of a locking element of the locking device which locks the mating coupling element or is designed for the detection thereof.

It is also possible that the control device is designed for the detection of a current of the drive motor, with which the drive motor is or can be operated. When the at least one adjustment element thus hits a stop assigned to the idle position and/or a stop assigned to the working position, the current for the drive motor increases. By means of a current sensor the control device detects if the current for the drive motor exceeds a threshold value, for example, and switches the drive motor off.

It is advantageous if at least one adjustment element of the adjustment device has a through-opening for a drive element, for example a gear wheel, with which another adjustment element of the adjustment device can be driven. The drive element can thus drive the other, adjacent adjustment element through the through-opening. In this it is possible that the drive element is not in engagement with the drive element having the through-opening, so that the latter is not driven. It is also possible, however, that an actuating contour or drive contour, e.g. a toothing for the drive element, is located at the through-opening, for example at its inner circumference or adjacent to its inner circumference, so that the drive element can drive the adjustment element having the through-opening as well as the other adjustment element located adjacent to the through-opening. This drive of the two adjustment elements is preferably simultaneous. The drive element can also drive the adjustment elements consecutively, however. At both of the adjustment elements, actuating contours or drive contours, in particular toothings, are advantageously provided for the drive element.

It is preferred if the adjustment elements are motion-coupled by means of an actuating gear mechanism for their relative adjustment, in particular for an opposing pivoting movement. The actuating gear mechanism facilitates a controlled simultaneous actuation of the adjustment elements. In this it is possible that one adjustment element is stationary, for example, while the other adjustment element is moved relative to the stationary adjustment element by means of the actuating gear mechanism. Preferred is an embodiment, however, in which both adjustment elements are movable with respect to the towing vehicle coupling and with respect to each other. The actuating gear mechanism advantageously forms a part of the actuating drive.

A preferred concept provides that the actuating gear mechanism has a gear wheel, in particular a friction wheel or gear, which is in actuating engagement on opposite sides with the one adjustment element, for example an actuating contour of the one adjustment element, and with the other adjustment element, for example an actuating contour of the other adjustment element, so that the one adjustment element is or can be driven in the opposite direction relative to the other adjustment element at a rotation of the gear wheel. The actuating contours can have toothings, for example. The actuating contours can also be designed as drive contours for an actuating drive or the actuating drive.

The gear wheel can be passive in a manner of speaking, i.e. it is driven by the actuation of the one adjustment element and in turn drives the other adjustment element. The gear wheel is preferably mounted rotatably at a bearing which is or can be located at the towing vehicle coupling in a stationary manner.

It is also possible, however, that the gear wheel is a drive gear, for example a drive pinion, of the above-mentioned drive motor for driving the adjustment elements. Such a gear wheel can readily be drivable manually as well.

At least one adjustment element preferably has a drive link and/or a toothing or a toothed section. The toothed section is designed in the manner of a rack, for example. The toothed section can also be designed as a sprocket or a curved toothed section. The above-mentioned gear wheel or the drive pinion of the drive motor meshes with said toothing or toothed section, for example.

The toothing or toothed section is preferably produced by laser cutting and/or mechanical machining of the adjustment element, for example by milling and/or forging or the like.

It is also possible, however, that the toothing or toothed section is produced at a tooth element which is fixed to the adjustment element, for example. To fix the tooth element to the adjustment element, joining or adhesive bonding is suitable, for example, e.g. bonding and/or welding and/or soldering. A positive connection, e.g. by means of bolting, by means of at least one rivet or the like, between the component having the toothing or the tooth element and the adjustment element can readily be provided as well.

Especially in the context of the manual actuation of the adjustment device, the following configuration is advantageous. In this it is provided that the actuating mechanism comprises a deflecting linkage which has at least two actuating arms, each of which is pivotable in its one end region with one of the adjustment elements about a pivot axis and in its other end region joined to a drive arm of the linkage, wherein at least one of the actuating arms is joined about a pivot axis to the drive arm of the linkage, so that the adjustment elements can be adjusted relative to one another by a pushing actuation or pulling actuation of the drive arm. Both actuating arms are advantageously joined pivotably to the drive arm. The drive arm can for example have a handle for gripping by an operator.

It is advantageous if the adjustment contour of the adjustment element forms a part of the deflection gear mechanism, so that the adjustment contour moves or guides the adjustment body, at a rotary actuation of the at least one adjustment element about a rotational axis, parallel to the rotational axis between the working position and the idle position in a linear fashion or with a linear component. If thus the annular adjustment body described below rotates about the rotational axis, for example, the adjustment body, and with the adjustment body the driver, are moved or guided parallel to the rotational axis or at least moved or guided with a directional component parallel to said rotational axis.

It is readily possible that the at least one adjustment element or the adjustment elements has/have a disc-shaped or plate-shaped form. It is preferred, however, if the at least one adjustment element has an annular or sleeve-shaped form. The adjustment element is for example represented by a sleeve body or tubular body. A compact design can be achieved as a result.

A preferred concept provides that the adjustment device has two in particular tubular or sleeve-shaped adjustment elements which extend in an annular fashion coaxially around a central axis and engage with each other, or of which one adjustment element accommodates the other adjustment element. In this way a tube-in-tube arrangement can be formed, in which each adjustment element forms or has a tube.

It is possible that one of the adjustment elements provided is stationary with respect to the coupling element, while the other adjustment element is mounted movably with respect to the coupling element by means of an adjustment element bearing. It is advantageously provided, however, that at least one of the adjustment elements or both adjustment elements is or are rotatable about the common central axis of the adjustment elements with respect to the coupling element.

The adjustment device preferably forms a housing or has a housing.

The following embodiment of the invention represents, in the context of a sensor apparatus according to the preamble of claim 1, an inherently independent invention. It may, however, also be an advantageous configuration of the earlier embodiments.

In this the sensor apparatus according to the preamble of claim 1 has an adjustment device with at least one adjustment element for moving and/or guiding the driver between a working position set closer to the mating coupling element and provided for rotationally driving the driver and an idle position farther away from the mating coupling element. In this the adjustment device can remain in engagement with the retaining device in the working position as well. It is furthermore advantageous, however, if the retaining device is movable in the working position without being influenced by the adjustment device.

In this inherently independent invention, and also advantageously with respect to the earlier embodiments, it is provided that the at least one adjustment element of the adjustment device forms a part of a housing which accommodates the retaining device at least partially, preferably completely, and/or that the adjustment device forms a housing for a support of the retaining device which carries the driver mounting device. All components of the retaining device can be located in the interior of the housing. It is also possible that only one support of the retaining device is located in the interior of the housing, but adjustment bodies joined to the above-mentioned mounting device pass through the housing and project outwards in front of the housing. For the provision and/or maintenance of the drive coupling between the driver and the coupling element in the working position, the adjustment bodies are located in recesses of the adjustment device, for example in the at least one above-mentioned movement recess for the adjustment body or bodies.

The at least one adjustment body can be represented by a component of the mounting device of the retaining device, for example by an articulated bar or by a body of the mounting device which is joined to an articulated bar.

It is also possible that the at least one adjustment body is joined to a joint, e.g. a swivel joint with pivotability about a single pivot axis, a universal joint or a ball joint, of the mounting device.

The housing preferably has a through-opening through which the driver and/or the driver mounting device and/or the retaining device carrying the driver mounting device, for example a support at which the at least one adjustment body is located, project(s) at least partially in front of the housing in the working position. It is advantageous if the respective above-mentioned components, i.e. the driver or the driver mounting device or the retaining device, are at least partially moved back into the housing in the idle position.

The housing preferably has a dome-like or cylindrical shape. The above-mentioned sleeve-shaped or tubular adjustment element can provide or form an outer circumferential wall of the housing, for example.

The sensor apparatus advantageously has a protective housing which protects the adjustment device against environmental influences, for example dirt, dust, water etc.

The protective housing is a plastic housing, a metal housing, an elastic housing, a rubber housing or a combination thereof, for example.

It is in particular advantageous if the protective housing is elastic and/or telescopic and/or longitudinally adjustable with respect to at least one degree of freedom of movement along which the driver is movable between the idle position and the working position. In the context of the preamble features of claim 1, such a protective housing represents an independent invention, in particular if it houses or accommodates the adjustment device entirely or partially.

Telescopic housing segments can be provided in the protective housing, for example. Seals, e.g. O-rings, are advantageously arranged between the housing segments.

The protective housing can for example easily comprise a bellows and/or a flexible rubber fabric and/or neoprene as well.

It is furthermore advantageously provided that the protective housing has at least one pivot bearing with which it is mounted rotatably with respect to at least one component, for example with respect to the driver and/or with respect to the towing vehicle coupling.

In the protective housing the adjustment device can be accommodated, for example. The retaining device can also be accommodated wholly or partially in the protective housing.

The protective housing can house or accommodate a housing formed by the adjustment device.

An advantageous variant of the previous embodiments, but also an independent invention in the context of the preamble features of claim 1, is present if it is provided that the driver is mounted with respect to the coupling element with at least one degree of freedom of movement different from the rotatability about the drive rotational axis by means of a mounting device which is or can be arranged to be stationary with respect to the towing vehicle coupling in order to provide or maintain a drive coupling with the mating coupling element, wherein the mounting device has bearing parts which are mounted slidably relative to one another by means of a sliding bearing, wherein the bearing parts are loaded towards a position away from one another by a spring assembly and/or have swivel bearing assemblies, in particular gimbal bearings in the regions averted from the sliding bearings, each of which gimbal bearings provides a pivotability of the bearing part connected to the respective swivel bearing assembly with two pivot axes extending at an angle, in particular a right angle, to each other, which pivot axes extend transversely, in particular at right angles, to the drive rotational axis. The pivot axes of the gimbal bearings or gimballed mounting extend transversely, in particular at right angles, to the drive rotational axis, for example. The one swivel bearing assembly, e.g. the one gimbal bearing, is stationary with respect to the coupling element, the other swivel bearing assembly, e.g. the other gimballed bearing, is stationary with respect to the driver mounting device, for example at an or the support carrying the driver mounting device. Instead of a gimbal bearing, a ball joint could be provided, which is only rotatable about two pivot axes extending at an angle, in particular a right angle, to each other, which are different from the drive rotational axis.

The sliding bearing preferably has anti-rotation contours, so that the bearing parts of the sliding bearing are displaceable relative to each other with respect to the longitudinal axis, but not rotatable about the longitudinal axis.

The spring assembly is preferably located in an interior of the sliding bearing, for example in a bearing receptacle of the one bearing part, where a bearing projection of the other bearing part is accommodated so as to be displaceable with respect to the displacement axis or longitudinal axis.

The at least one adjustment element is preferably designed as a sleeve body or a plate body. A few advantageous variants of the at least one adjustment element are explained below. In this it is possible that, if several adjustment elements are provided, at least two adjustment elements are similar, for example consisting of the same metal or other material. It is also possible, however, that combinations are provided, i.e. that one adjustment element consists of metal, for example, and the other of plastic, or that the adjustment elements have different coatings.

The at least one adjustment element preferably consists of metal and/or plastic. Particularly preferred is a fibre-reinforced or bead-reinforced plastic. The fibres or beads consist of carbon, metal or the like, for example.

The at least one, in particular sleeve-shaped, adjustment element preferably consists of steel. The steel is preferably stainless or coated, e.g. with a lacquer and/or a galvanic deposit.

In a multi-part adjustment element, which consists of two bodies joined to each other, for example, welding, clamping or the like is advantageous. In this case there is for example a seam between the mutually joined bodies. This seam is preferably scraped, particularly on the side which comes or can come into contact with another adjustment element or a bearing. A radially outer sleeve-shaped adjustment element, in particular designed in the manner of an outer tube, has a seam which is scraped on the inside, for example. An adjustment element designed as an inner tube or inner sleeve preferably has a machined, e.g. scraped, seam radially outside. The respective seam can be toleranced on the inside and/or the outside, for example.

The at least one adjustment element can advantageously consist of aluminium as well A pairing of two adjustment elements, which can both consist of steel or aluminium, is particularly advantageous.

The aluminium is preferably a hardenable or naturally hard wrought alloy. The aluminium can also be a cast alloy, however, for example produced by die casting.

The at least one adjustment element can also consist of a plastic, in particular a composite plastic. The plastic can comprise a matrix of elastomers and duromers. The composite material containing plastic or the composite plastic can comprise an elastomer and/or duromer matrix, for example. To increase its strength and/or resistance, reinforcement components, e.g. in bead and/or fibre form, can be incorporated into the plastic. The adjustment element can also be produced from a semi-finished plastic material, however.

It is advantageously provided that the driver has a slide-on chamfer and/or at least one resilient or elastic component. The driver can then for example divert along the linear axis or displacement axis when the mating coupling element is coupled to the coupling element and in addition yield transversely to the linear axis or displacement axis in order to facilitate or simplify a movement of the mating coupling element in contact with the driver, so that the driver and the mating coupling element are or come into drive contact.

A sliding bearing body of the mounting device is preferably fixed at a stationary component of the towing vehicle coupling by means of an elastomer body, so that the sliding bearing body is deflectable with respect to the stationary component in at least one direction transversely to its sliding axis. The sliding bearing body for example comprises a bearing receptacle, a bearing axis body or the like, at which a further bearing body is mounted so as to be longitudinally displaceable with respect to the sliding axis. The sliding axis can thus tilt or pivot with respect to the stationary component of the towing vehicle coupling, preferably for tolerance compensation.

The driver can for example be mounted, in particular by means of the retaining device, on gimbals with respect to the coupling element or at the coupling element. The gimbal axes or gimballed axes differ from the drive rotational axis, however. The driver is for example mounted at the driver mounting device so as to be rotatable about the drive rotational axis, which is in turn gimbal-mounted with respect to the coupling element.

The driver is advantageously mounted movably with respect to the coupling element with at least one degree of freedom of rotation which differs from the rotatability about the drive rotational axis for providing or maintaining the drive coupling with the mating coupling element, which degree of freedom of rotation facilitates a deflection of the driver with respect to the coupling element of at least 3° or at least 5° or at least 10° from a central position of the driver with respect to the coupling element and or a deflection of the driver with respect to the coupling element of maximally 30°, advantageously maximally 20° or maximally 10°, from a central position of the driver with respect to the coupling element. The driver can be deflectable from the central position with respect to the rotational axis, which differs from the drive rotational axis and can also be described as a pivot axis, towards mutually opposite sides by maximally 30°, in particular maximally 20° or maximally 10°. A greater deflection of the driver from the central position, exceeding the above values, is advantageously not required and/or not provided.

A maximum total deflectability of the driver about a rotational axis/pivot axis extending at an angle to the drive rotational axis is maximally 60°, maximally 40° or maximally 20°, for example.

A preferred concept provides that at least two pivot axes, preferably three or all pivot axes, of the mounting device are mutually parallel pivot axes for providing or maintaining a drive coupling with the mating coupling element.

The driver is preferably mounted so as to be movable with respect to the mating coupling element by means of at least one four-bar linkage and/or a linkage parallelogram. By means of the four-bar linkage the driver and/or the bearing body supporting the driver are/is adjustable relative to the coupling element, for example in the manner of a parallelogram. The four-bar linkage comprises pivot bars, for example, in the longitudinal end regions of which swivel joints, in particular multi-axially pivoting joints, preferably ball joints, are located.

The four-bar linkage can be located at a swivel bearing, for example, so that the four-bar linkage itself provides one of the pivot axes which provide a translational degree of freedom of movement, while the other pivot axis is provided by the swivel bearing.

The driver is furthermore not located directly in the mounting region of coupling element and mating coupling element, so that a retrofit of an existing towing vehicle coupling is easier. The mounting region is heavily loaded mechanically in the flow of forces between towing vehicle and trailer vehicle and is not weakened by the driver. A receptacle or installation space for the driver is not required.

It is advantageous that there is no need for special measures at the kingpin or in any case at the coupling of the semitrailer. Instead the driver of the sensor apparatus according to the invention is designed and provided for rotational driving or rotational coupling to the king pin. The driver mounting device is or can be located at the coupling element of the towing vehicle, for example.

A preferred embodiment provides that the sensor apparatus is designed and/or provided for location in a receiving space of the towing vehicle coupling provided at the coupling receptacle, for example the coupling jaw. A geometric design of the sensor apparatus is advantageously such that it can be located in the receiving space. The receiving space is for example located below the coupling receptacle or adjacent to a support plate of the towing vehicle coupling. The receiving space can be designed as a cavity, a recess or the like, for example. It is preferred if the receiving space exists anyway as it were, i.e. that an existing towing vehicle coupling can be retrofitted with the sensor apparatus.

The sensor apparatus can expediently be secured at the towing vehicle coupling by means of a fastening means. The fastening means comprises a screwing means, a clamping means, a positive-locking contour or the like, for example. Bonding and/or welding as fastening means for securing the sensor apparatus at the towing vehicle coupling are/is readily advantageous as well. Bonding and welding have the advantage that the structure of the towing vehicle coupling remains unchanged, there being no need for holes or the like, for example. Capacitor discharge welding is suitable, for example, for producing a weld between the sensor apparatus and the towing vehicle coupling. The sensor apparatus can furthermore be joined to the towing vehicle coupling by means of at least one rivet. So-called welding studs, in any case at least one welding stud, can also be used, i.e. studs with which one component thereof is welded to the towing vehicle coupling.

Finally a suction means, e.g. a suction head, is also suitable as a fastening means. A suction head can be located at the retaining device, for example, and designed and/or provided for drawing the retaining device to a coupling arm or to a surface adjacent to a coupling receptacle of the towing vehicle coupling.

The driver expediently has an end face through which the drive rotational axis passes and which is designed and/or provided for being driven by the mating coupling element. The end face is a frictional surface, a surface with positive-locking contours or the like, for example. The end face is therefore used for frictional or positive-locking entrainment by the mating coupling element. The end face is also suitable for optimum entrainment, however, if there is magnetic adhesion and/or if the driver is loaded by a spring assembly towards a drive contact with the mating coupling element, which will become clearer at a later point. It is advantageously provided that the driver has an end face through which the drive rotational axis passes and which is designed and/or provided for exclusively frictional and/or magnetic entrainment by a drive surface at a front side of the mating coupling element.

The end face is expediently designed as a plane surface or has a plane surface. The end face and a drive surface at a front side of the mating coupling element advantageously bear against each other, in particular in a planar fashion, in the working position.

The end face of the driver is advantageously provided in the working position for bearing against the or a drive surface provided at a front side of the mating coupling element opposite the driver and is exclusively in contact with the drive surface with those surface sections whose normal direction is parallel to the drive rotational axis. The end face of the driver and the front side of the mating coupling element are plane surfaces, for example, which accordingly bear against each other only in their respective normal direction. It is also possible, however, that the end face of the driver or the drive contours of the mating coupling element has a wave contour or a flute contour. The respective vertices of the waves or flutes are in drive contact with the drive surface of the mating coupling element.

A front side of the driver through which the drive rotational axis passes expediently has at least one ring or is represented by a ring. It is self-evident that an end face on the one hand and additionally a ring on the other hand can be provided on the front side, which ring acts on an outer circumference of the mating coupling element, for example, or can come into contact with an outer circumference of the mating coupling element with its front side. The ring can as it were be designed as an annular projection in front of an end face which is likewise provided for frictional, positive-locking or other drive coupling with the mating coupling element.

The driver advantageously has at least one inclined surface, in particular a lead-in chamfer, a conical surface or the like, along which the mating coupling element can slide when being coupled to the towing vehicle coupling. Such an inclined surface can for example be designed or provided as a conical surface between the above-mentioned end face or plane surface on the one hand and an outer circumference of the driver on the other hand.

The sensor apparatus preferably has a force application means or several force application means for applying a force to the driver in the direction of the mating coupling element. The driver is thus subjected to a force towards the mating coupling element, which facilitates or improves the drive coupling.

At least one friction-locking surface for a frictional contact with the mating coupling element and/or at least one positive-locking contour for positive mutual engagement of the mating coupling element and the drive are/is expediently provided or located at the driver. The friction-locking surface can comprise a rubber surface or the like.

It is advantageously provided that the driver is exclusively designed for frictional rotational driving by the mating coupling element or for frictional contact with the mating coupling element. The driver in particular preferably has exclusively one friction-locking surface, for example an end face, for frictional contact with the mating coupling element.

The driver expediently does not have a positive-locking contour for positive rotational driving by the mating coupling element.

The driver can have a drive ring or an annular section. A plurality of part-rings coupled or joined to one another can also be provided at the driver. An annular or part-ring-shaped circumferential drive contour is also advantageous in the driver.

The sensor apparatus expediently comprises at least one sensor or sensor transducer mounted so as to be rotatable about the drive rotational axis, in particular a ring comprising an assembly of several sensors or sensor transducers. The rotatable sensor or sensor transducer is rotationally coupled or rotationally joined to the driver. If the driver thus rotates about the drive rotational axis, it carries the at least one sensor or sensor transducer along.

It is also advantageous if the sensor apparatus has an annular arrangement of several sensors or sensor transducers arranged around the drive rotational axis. A "counterpart" of the respective sensor or sensor transducer, i.e. a sensor transducer for the sensor and a sensor for the sensor transducer, is expediently arranged to be stationary with respect to the drive rotational axis. The annular arrangement of several sensors or sensor transducers, which are in particular rotatable about the drive rotational axis, facilitates an optimal resolution of an angle signal generated by the sensor apparatus at a rotation of the driver about the drive rotational axis.

The coupling joint rotational axis, which corresponds to the drive rotational axis, is expediently a vertical axis and/or a rotational axis extending substantially vertically.

It is advantageously provided that the coupling joint rotational axis and the drive rotational axis are coaxial and/or in alignment with each other when the coupling element and the mating coupling element are coupled to each other. A transverse distance between the two rotational axes is also possible, however. It is at least advantageous if the coupling joint rotational axis and the drive rotational axis extend parallel to each other when the coupling element and the mating coupling element are coupled to each other.

The sensor is a magnetic sensor, a Hall sensor or the like, for example. The sensor may however also be an optical sensor, a capacitive sensor, an inductive sensor or the like. Combinations of different sensors or sensors which physically detect in different ways are possible.

The coupling element comprises or is represented by a coupling ball, a coupling receptacle or the like, for example. A trailer coupling of a trailer vehicle can for example be hitched to the coupling ball or to another positive-locking element. The coupling receptacle, e.g. a coupling jaw, is suitable for the accommodation of a positive-locking element of the trailer coupling of the trailer vehicle or of a semitrailer, for example of a so-called king pin.

One embodiment can provide that the coupling element is a coupling ball and the mating coupling element is a coupling receptacle of a traction coupling of a trailer vehicle. The coupling element designed as a coupling ball expediently projects in front of a coupling arm or is located in a free end region of a coupling arm.

It is possible that the driver is mounted at a coupling carrier or coupling arm at which the coupling element is located. The coupling carrier has a bearing receptacle or another bearing contour for the driver, for example. The coupling carrier thus forms the driver mounting device or carries the driver mounting device.

It is advantageously provided that the sensor apparatus is or can be located at a so-called semitrailer coupling in which the coupling element has a coupling receptacle, for example a coupling jaw, for accommodating a king pin of the mating coupling element. In this case the receptacle is provided at the towing vehicle, while the component engaging with the receptacle is provided at the trailer vehicle. The coupling element advantageously has a coupling receptacle, in particular a coupling jaw, for accommodating a king pin of the mating coupling element.

It is advantageously provided that the mating coupling element can pivot relative to the coupling element about the drive rotational axis by a pivoting angle of at least 140°, preferably 160° or further preferably at least 180° or at least 220°.

It is furthermore advantageous if the drive has a drive surface lying outside the coupling joint, in particular a friction-locking surface, a positive-locking surface or the like, for entrainment by the mating coupling element. The drive surface is for example located outside coupling joint surfaces of the coupling element and the mating coupling element, with which the coupling element and the mating coupling element slide along each other. The drive surface is furthermore located advantageously adjacent to the coupling element and/or the mating coupling element.

The driver preferably has means for a frictional and/or non-positive and/or magnetic hold at the mating coupling element.

It is advantageously provided that the sensor apparatus is located at the towing vehicle, while the trailer vehicle forms the passive device, which nevertheless actuates the sensor apparatus. The trailer vehicle does not have to be modified.

The sensor apparatus can be provided for retrofitting towing vehicles, i.e. the towing vehicle coupling can be fitted with the sensor apparatus at a later date, e.g. by bonding, welding, clamping or the like.

It is furthermore possible that the towing vehicle coupling and/or the coupling of the trailer vehicle, which has the coupling element, are/is not or do/does not have to be altered mechanically. Components of the towing vehicle coupling and the coupling of the trailer vehicle provided in the flow of forces or for force transmission between towing vehicle and trailer vehicle in particular remain unchanged, for example the regions of the coupling element and the mating coupling element which engage with each other and form the coupling joint and/or a locking device of the towing vehicle coupling or the coupling of the trailer vehicle or the like.

BRIEF DESCRIPTION OF THE DRAWINGS

It is advantageously provided that a locking technology or locking device of the towing vehicle coupling or the coupling of the trailer vehicle does not have to be modified.

Embodiments of the invention are explained below with reference to the drawing, of which.

DETAILED DESCRIPTION

Figure 1:
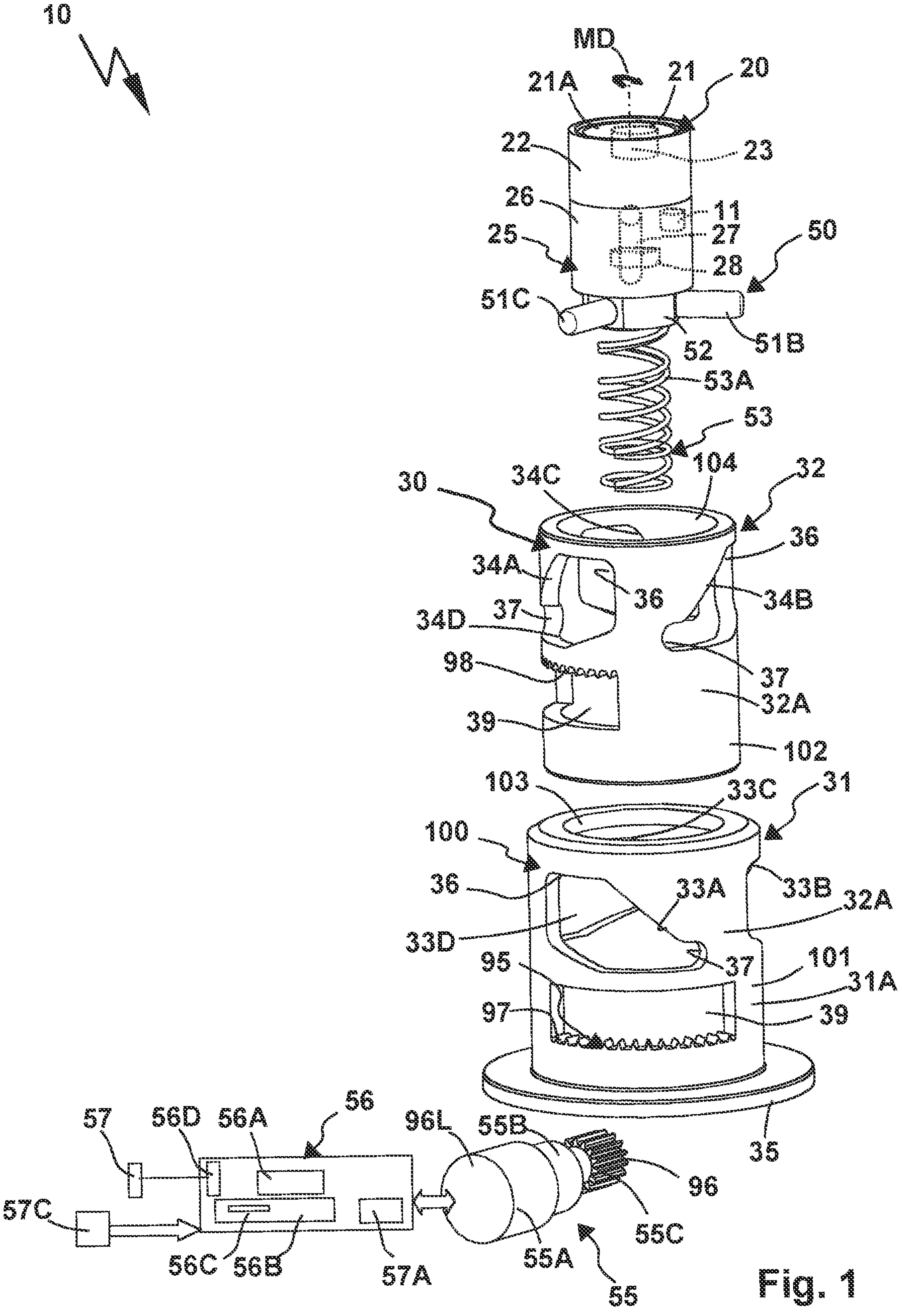
FIG. 1 shows an exploded perspective view of a sensor apparatus with an adjustment device.

In the exemplary embodiments explained below, components are partially similar or identical in their functionality. In this respect reference numbers are used which differ by 100 or are partially identical.

A towing vehicle coupling 60 is designed as a semitrailer coupling 60A. The semitrailer coupling 60A has a coupling element 61 in the form of a so-called mounting plate 61A. At the mounting plate 61A and thus at the coupling element 61, an insertion receptacle 62 is provided, which could also be described as insertion opening. The insertion receptacle 62 facilitates the insertion of a mating coupling element 81 of a trailer coupling 80 having a so-called pin 82 or king pin 82. The pin 82 is used to couple the trailer coupling 80 to the towing vehicle coupling 60.

The towing vehicle coupling 60 is or can be located at a towing vehicle Z. The towing vehicle Z is a so-called articulated lorry, for example or another heavy goods vehicle.

The trailer coupling 80, on the other hand, is or can be mounted at a trailer vehicle A, for example a so-called semitrailer.

In order to couple the trailer coupling 80 to the towing vehicle coupling 60, the king pin or pin 82 is led to the coupling element 61, for example from a rear side of the towing vehicle Z or from a front side of the coupling element 61, the towing vehicle Z in practice reversing in order to couple the semitrailer and thus the trailer vehicle A.

The trailer vehicle A is supported on a top side 83 of the trailer coupling 80 or of the pin 82.

The top side 83 is joined to an underside of the trailer vehicle A, for example welded or bolted.

The top side 83 is provided at a flange body 84, the underside—averted from the top side 83—of which forms a support surface 85 for support at the towing vehicle coupling 60. The support surface 85 is used for location on a locating surface 65 on the top side 64 of the mounting plate 61A or the coupling element 61. The locating surface 65 and the support surface 85 are preferably plane surfaces. The trailer coupling 80 is therefore supported across a large area on the locating surface 65 in a horizontal plane, so that essential supporting forces do not act on the king pin 82 itself, which engages with a coupling receptacle 70 of the towing vehicle coupling 60 with a pin section 91.

A lead-on chamfer 66, along which the support surface 85 can slide when the trailer coupling 80 is coupled to the towing vehicle coupling 60, is located on the front side 63. The insertion of the king pin 82 into the coupling receptacle 70 is facilitated by lead-in chamfers 68, which bound the insertion receptacle 62 laterally and extend towards the coupling receptacle 70 in a tapering fashion. The lead-in chamfers 68 extend from the front side 63 towards a front side 69 of the coupling element 61 or the mounting plate 61A.

The coupling receptacle 70 has a substantially cylindrical inner contour 71, wherein said inner contour 71 does not have to be completely cylindrical, but only forms an enveloping inner contour in a manner of speaking. In this way the pin section 91 with its likewise substantially cylindrical outer circumferential contour 86 is therefore at least partially supported at the inner circumference of the coupling receptacle 70, so that the king pin 82 can rotate essentially about a coupling joint rotational axis GZ relative to the towing vehicle coupling 60.

A support body 72 is located on an underside 74 of the coupling element 61 or the mounting plate 61A. The support body 72 is provided adjacent to and/or below the coupling receptacle 70. The support body 72 can be plate-like. The king pin 82 has to be inserted into the coupling receptacle 70 past the support body 72 when the trailer coupling 80 is coupled to the towing vehicle coupling 60.

The trailer coupling 80 can be locked at the towing vehicle coupling 60 by a locking device 75. The locking device 75 comprises a locking body 76, which engages with a locking receptacle 87 of the pin 82, which is provided at the outer circumference 86 thereof.

The pin 82 can easily be inserted into the coupling receptacle 70, since a lead-on chamfer 89 is for example provided on its front side 88, i.e. the side of the pin 82 which is opposite the flange body 84. The lead-on chamfer 89 is provided by a rounded or conical edge section between the outer circumference 86 and the front side 88 or end face of the pin 82.

The locking body 76 can expediently be driven by a manual or motorised locking drive 77, so that it engages with the locking receptacle 87 in its locking position and is moved out of the locking receptacle 87 in its release position, so that the pin 82 can be moved out of the coupling receptacle 70.

The trailer coupling 80 can rotate with respect to the towing vehicle coupling 60 about the coupling joint rotational axis GZ, i.e. a rotational axis which is usually vertical when travelling, but also about coupling joint rotational axes GX and GY, i.e. about a longitudinal axis and a transverse axis extending in particular in the vehicle longitudinal direction of the towing vehicle Z as well as orthogonally at right angles to the vehicle longitudinal direction of the towing vehicle Z.

If the trailer coupling 80 is coupled to the towing vehicle coupling 60, the mating coupling element 81 can rotate or pivot relative to the coupling element 61 with respect to the coupling joint rotational axes GX, GY and GZ, so that the coupling element 61 and the mating coupling element 81 form a coupling joint 91. The mating coupling element 81 and the coupling element 61 are in bearing engagement with each other in a bearing region 96. The bearing region 96 is preferably approximately cylindrical.

When negotiating a curve, for example, the trailer vehicle A can swivel relative to the towing vehicle Z substantially about the coupling joint rotational axis GZ. At a rolling movement, however, the trailer vehicle A can swivel relative to the towing vehicle Z about the coupling joint rotational axis GX, and/or at a pitching movement about the coupling joint rotational axis GY.

In these cases it is possible to detect a pivoting or rotation of the trailer vehicle A relative to the towing vehicle Z about the coupling joint rotational axis GZ, namely by means of a sensor apparatus 10.

The sensor apparatus 10 is accommodated in a receiving space 67 below the coupling receptacle 70. The receiving space 67 is a receiving space which is in any case provided in a semitrailer coupling 60A, i.e. there is no need for a structural modification.

The sensor apparatus 10 is provided for rotational entrainment by the mating coupling element 81, which has a drive surface 90 for this purpose. The drive surface 90 is represented by the front side 88, for example, or provided thereon. However, the slide-on chamfer 89 or another region of the outer circumferential contour 86 can wholly or partially form the drive surface 90 as well, which will become clearer.

The sensor apparatus 10 has a driver 20, which can be entrained by the mating coupling element 81, i.e. the pin or king pin 82, and rotated about a drive rotational axis MD.

The driver 20 has a drive surface 21 for establishing a drive contact or a drive connection to the pin 82. The drive surface 21 is provided on a free front side of the driver 20. From the drive surface 21 there extends a circumferential wall 22, which is substantially conical or cylindrical, for example.

The drive surface 21 is provided at a front wall 21A substantially designed as a plane or level wall. The circumferential wall 22 extends from the front wall 21A.

The sensor apparatus 10 comprises a sensor 11, for example a magnetic sensor. Signals generated by the sensor 11 are evaluated by an evaluation device 12, which comprises a processor 13 and a memory 14, for example. The processor 13 executes programme code of at least one programme 16, which processes the sensor signals of the sensor 11 and makes them available to an interface 15, in particular a bus coupler, for an on-board power supply N of the towing vehicle Z, for example. The interface 15 is a CAN bus interface, for example, but can easily be or comprise another digital or analogue interface.

The driver 20 is mounted at a driver mounting device 25 so as to be rotatable about the drive rotational axis MD. The driver mounting device 25 comprises a cylindrical housing 26, for example, in which a rotational axis body 27 is rotatably mounted at one or more pivot bearings 28. The rotational axis body 27 is non-rotatably joined to the driver 20. The driver 20 can therefore rotate about the drive rotational axis MD relative to the driver mounting device 25.

One or more sensor transducers 24, e.g. magnets used for exciting the sensors 11, is/are non-rotatably joined to the rotational axis body 27.

At this point it should be mentioned, however, that the magnetic measuring principles or sensor principles of the sensor apparatus 10 are not the only embodiment. In a sensor apparatus according to the invention, inductive, capacitive or optical sensors—also in combination—can be provided, for example. Instead of the sensor transducers 24 designed as magnets, optical markings, in particular lines or the like, can be provided, for example, which markings are detectable by an optical sensor 11. Capacitive detection is readily possible as well, for example if suitable electric fields are provided by the sensor transducers.

Instead of the sensor transducer 24, other sensor elements or sensors can also be provided. The sensorial detection of the position of a driver relative to a support or bearing body, in particular the driver mounting device 25, can therefore also be realised by at least one sensor which is located at the driver and thus rotates about the drive rotational axis relative to the support or the driver mounting device.

The driver 20 can wholly or partially consist of an elastic material, for example a flexible plastic, rubber or the like. Particularly advantageous is an elastic resilience in the region of the drive surface 21.

The end wall 21A is preferably designed as a frictional surface or has a frictional surface. Corundum, quartz, rock particles or a similar hard material with sharp edges and in any case points or the like are provided at the frictional surface, for example.

The driver 20 preferably has a magnet 23 or another magnet arrangement for providing a magnetic force of attraction loading the driver 20 towards the mating coupling element 81. It is possible that the driver 20 as a whole is represented by the magnet 23 or that the magnet 23 is embedded into a base body of the driver 20.

The driver 20 can be deflected from its central position by degrees of freedom of rotation DX and DY and/or by degrees of freedom of linear movement LX, LY and LZ.

The degrees of freedom of rotation DX and DY and the degrees of freedom of linear movement LX, LY and LZ are degrees of freedom of movement BF which differ from the rotatability about the drive rotational axis MD and are used to maintain a drive coupling of the driver 20 to the mating coupling element 81.

The degrees of freedom of pivoting or degrees of freedom of rotation DX, DY extend orthogonally to the drive rotational axis MD and in each case orthogonally to each other. With the degree of freedom of rotation DX, for example, the driver 20 can pivot about an axis SX which is parallel to the coupling joint rotational axis GX. If deflected or displaced with the degree of freedom of linear movement LX, the driver 20 can be deflected in a linear fashion about the axis SX parallel to the coupling joint rotational axis GX, i.e. moved at right angles to the drive rotational axis MD.

The further degree of freedom of linear movement LY allows a deflection or displacement of the driver 20 transversely to the degree of freedom of linear movement LX or to the X-axis and/or along an axis SY which is parallel to the coupling joint rotational axis GY. At a rotation by the degree of freedom of rotation DY, the driver 20 rotates about said axis SY parallel to the coupling joint rotational axis GY.

The displaceability with the degree of freedom of movement LZ is provided to be parallel to or coaxial with the drive rotational axis MD.

All of the above-mentioned degrees of freedom of rotation DX, DY or degrees of freedom of linear movement LX, LY or LZ allow the driver 20 to be deflected from its central position, for example when the trailer coupling 80 is coupled to the towing vehicle coupling 60, so that its end wall 21A comes to lie in a plane parallel fashion at the front side 88 or the support surface or the drive surface of the pin 82. In addition the rotational drive coupling of the driver 20 is made possible even at a deflection transverse to the drive rotational axis MD. The driver 20 thus pivots with the degree of freedom of rotation DX and/or DY, for example, but still remains in drive contact with the pin 82.

The mobility of the driver 20 by the degrees of freedom of movement DX, DY, LX, LY and LZ is provided by the retaining device 40, which is permanently located at the driver mounting device 25, thus being immobile.

The retaining device 40 holds the driver mounting device 25 non-rotatably with respect to the drive rotational axis MD while allowing movements of the driver mounting device 25 and thus of the driver 20 by the degrees of freedom of movement DX, DY and the degrees of freedom of translational or linear movement LX, LY and LZ.

The retaining device 40 comprises a mounting device 40A.

The mounting device 40A comprises a swivel bearing 41, which comprises a bearing base 42 which is stationary with respect to the towing vehicle coupling 60. A shaft body 43 which pivotably mounts a swivel body 44 passes through the bearing blocks, for example. The shaft body 43 is for example mounted pivotably at the swivel body 44 and/or the bearing base 42.

A further swivel bearing 45 is provided at the swivel body 44. The pivot axes R1Y and R2Y of the swivel bearings 41, 45 extend parallel to each other. The longitudinal axes of the shaft bodies 43, 46 are therefore parallel to each other.

The swivel bearing 45 is used for the pivotable mounting of two articulated rods 47, which project from the swivel body 44 towards the driver mounting device 25 and hold the driver mounting device 25.

Each of the articulated rods 47 carries a shaft body 48, which holds a support 50 of the retaining device 40, on which the driver mounting device 25 is located, so as to be pivotable about a pivot axis corresponding to the degree of freedom of rotation DY. The driver mounting device 25 can therefore pivot about the pivot axis DY, but is held non-rotatably relative to the drive rotational axis MD by the support 50. The shaft bodies 48 are represented by or connected to adjustment bodies 51, for example.

It is possible that each of the shaft bodies 48 is joined to the support 50 so as to be pivotable about a pivot axis, e.g. the pivot axis DY, i.e. each shaft body 48 can pivot at the support 50 about a pivot axis DY.

If the shaft bodies 48 are in alignment witch each other, both pivot about the same pivot axis DY. If the shaft bodies 48 are angled relative to each other, each of the shaft bodies 48 can pivot about its own rotational axis or pivot axis, which axes are then angled to each other.

It is also possible, however, that the shaft bodies 48 are pivotable about the pivot axis DY by means of ball joints 47C, 47D to be described below, in which case both is possible, i.e. that the shaft bodies 48 are joined to the support 50 so as to be non-rotatable or rotatable with respect to the pivot axis DY. The rotatability or the degree of freedom of rotation with respect to the pivot axis DY is also possible by means of the ball joints 47C, 47D if the shaft bodies 48 or adjustment bodies 51 enclose an angle with each other, i.e. are not in alignment but have a mutual angular distance of e.g. 160-180°.

Figure 13:
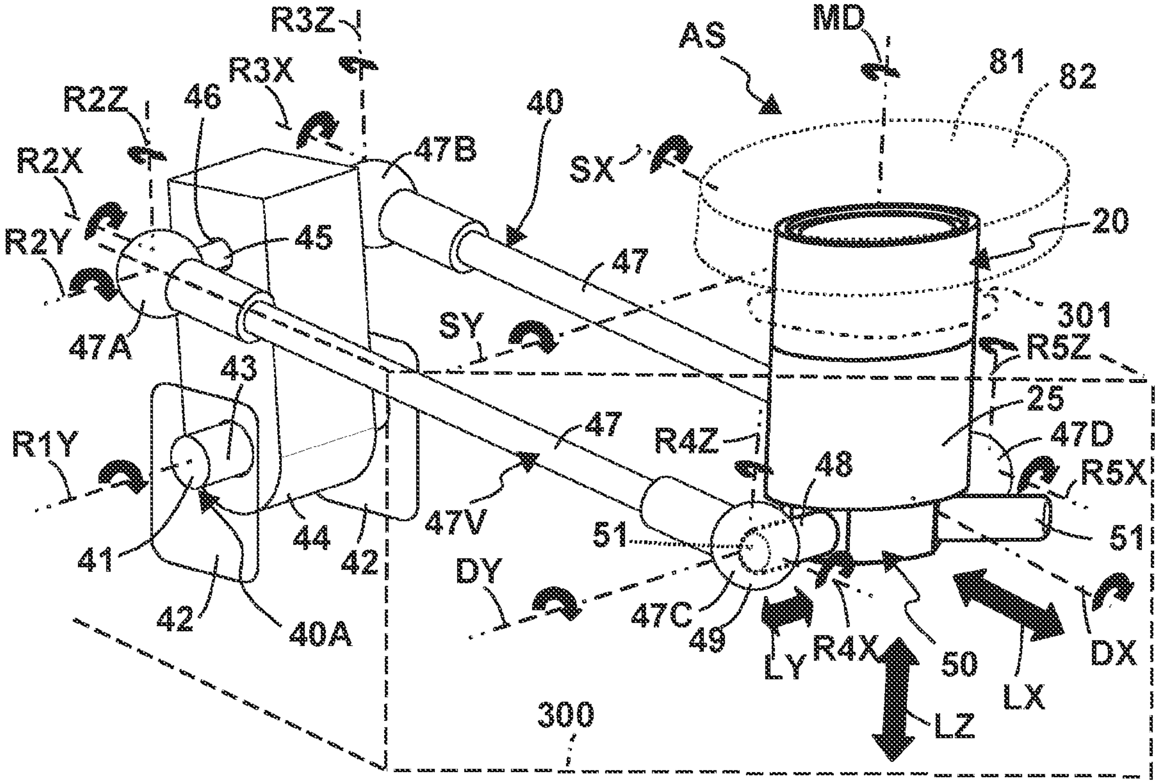
FIG. 13 shows a perspective oblique view of a retaining device of the sensor apparatus according to the preceding figures.

In FIG. 13 it can be seen that one of the adjustment bodies 51 is not connected to the mounting device 40. It is possible that this adjustment body 51 is not provided, i.e. that only those adjustment bodies 51 which form shaft bodies 48 are provided.

To provide the degrees of freedom of movement LX, LY and LZ, the articulated rods 47 are joined to the shaft bodies 46 and 48 by ball joints, i.e. by means of ball joints 47A, 47B, 47C and 47D. The ball joints 47A-47B allow further degrees of freedom of rotation and degrees of freedom of pivoting R2X, R3X, R4X, R5X as well as R2Z, R3Z, R4Z and R5Z.

At this point it should be mentioned, however, that a gimballed mounting would be possible instead of the ball joints 47A-47B.

The articulated rods 47 and the shaft bodies 46, 68 define with their swivel joints, i.e. the ball joints 47A-47B in their connecting regions, a four-bar linkage 47V and/or an articulated parallelogram.

It should furthermore be mentioned that, for the degrees of freedom of pivoting or the degrees of freedom of rotation DY and R2Y, the swivel bearing 45 and a swivel bearing 49 comprising the shaft body 48 are sufficient. It is also possible that the swivel bearings 45, 49 provide a displaceability and thus a degree of freedom of translational movement. If the shaft bodies 46, 48 are for example displaceable with respect to the component at which they are rotatably located, i.e. with respect to the swivel body 44 and the support 50, degrees of freedom of translational movement LY can easily be realised.

The swivel bearings 41, 45, 49 form a swivel bearing assembly which allows a translational movement or a degree of freedom of translational movement of the driver 20, i.e. the degree of freedom of movement LX. The driver 20 pivotably mounted by means of swivel bearings 41, 45, 49 to realise a degree of freedom of translational movement. The pivot axes of the swivel bearings 41, 45, 49 are parallel to one another.

The degree of freedom of translational movement LY is also exclusively realised by swivel bearings, i.e. the ball joints 47A-47B.

In a working position AS the driver 20 is in drive contact with the mating coupling element 81. In an idle position R, on the other hand, the driver 20 is removed from the mating coupling element 81, so that the mating coupling element 81 cannot entrain the driver 20. The idle position R is in particular provided for coupling the trailer coupling 80 to the towing vehicle coupling 60, while the working position AS of the driver 20 is set when the mating coupling element 81 is in engagement with the coupling element 61, i.e. coupled thereto.

To move the driver 20 between the working position AS and the idle position R, an adjustment device 50 with an actuating drive 55 is provided.

The actuating drive 55 comprises a drive train with an electric drive motor 55A, which drives an output 55C via a gear mechanism 55B. The drive motor 55A can be driven in mutually opposite directions to oscillate to and fro. The output 55C is designed in the manner of an output shaft, for example, and has a drive pinion 55D.

It is advantageous that the actuating drive 55 can move the driver 20 between the working position AS and the idle position R even when the mating coupling element 81 is in engagement with the coupling element 61.

To control the actuating drive 55, a control device 56 is provided,

The control device 56 is a microprocessor controller, for example, but a control having analogue, e.g. logical, gates, would readily be possible as well. A processor 56A and a memory 56B of the control device are internally connected to each other, wherein at least one control programme 56C stored in the memory 56B can be executed by the processor 56A, so that it carries out the functions explained below.

For communication with e.g. the actuating drive 55, in particular the actuating or drive motor 55A, and with a sensor 57, an input/output interface 56D of the control device 56 is provided.

The sensor 57 for example detects a position of the mating coupling element 81 relative to the coupling element 61 in order to ascertain in this way that the mating coupling element 81 is in engagement with the coupling element 61, i.e. in a coupling position.

It is also possible, however, that the sensor 57 detects a position of the locking body 76, e.g. its closed position. In this case the control device 56 can move the driver 20 and the driver mounting device 25 from the idle position R into the working position AS, if the locking body 76 is moved from its idle position R into its locking position. If the locking body 76 is moved from its locking position towards an idle position R provided for uncoupling the trailer vehicle A, however, the control device 56 activates the drive motor 55A for movement from the working position AS into the idle position R.

It would also easily be possible that the locking drive 77 is coupled to the control device 56, for example, signalling via a signalling line not shown in the drawing whether the locking drive 77 is activated to move from the locking position into the idle position R or vice versa. The locking drive 77 can also be represented by a manual actuating element, in particular an operating lever, the position of which can be detected by the control device 56 by means of a sensor 57B.

The control device 56 furthermore advantageously has a current sensor 57A for the detection of a drive current for the drive motor 55A. If the driver 20 is moved into the idle position R or the working position AR, the drive motor 55A can no longer rotate, as a result of which the drive current increases, which can be detected by the current sensor 57A. The control device 56 then switches the drive current off.

The control device 56 can furthermore be activated by a switch 57C, e.g. a pushbutton, for activating the drive motor 55A for activation towards the working position AS and/or towards the idle position R.

The driver mounting device 25 is located at the support 50. The support 50 comprises a support plate 52, on the top side of which the driver mounting device 25 is located. The support 50 is loaded towards the working position AS by a spring assembly 53 with a compression spring 53A.

The support 50 and thus the retaining device 40 and the components located thereon, i.e. the driver mounting device 25 and the driver 20, are movable between the idle position R and the working position AS by means of an adjustment device 30.

The adjustment device 30 forms a guide 30F, which guides the support 50 along an adjustment path VS between the working position AS and the idle position R. In this it is advantageously provided that the guide 30F is a forced guide, i.e. that the support 50 is guided by the adjustment device 30 along the adjustment path VS from the idle position R until it reaches the working position AS. In the present case the adjustment path VS is a linear adjustment axis or a substantially linear axis, any deviations of the adjustment path from a linear adjustment axis being caused by motoric play.

The adjustment path VS preferably extends parallel to the drive rotational axis MD or at an angle of maximally 10° inclined thereto.

The adjustment device 30 comprises adjustment elements 31, 32, which have adjustment contours 33, 34, at which adjustment bodies 51 connected or motion-coupled to the support 50 and thus to the retaining device 40 are guided. The adjustment contours 33, 34 are inclined with respect to the adjustment path VS and in the present embodiment act as adjustment contours for resetting the driver 20 from the working position AS into the idle position R. The spring assembly 53, i.e. a component of the retaining device 40, specifically acts towards the working position AS.

The adjustment elements 31, 32 are designed as sleeve bodies or tubular bodies. The adjustment element 32 is accommodated in an interior of the adjustment element 31.

The adjustment elements 31, 32 are mounted so as to be rotatable about a rotational axis DA. In this it is possible that only one of the adjustment elements 31, 32 is mounted for rotation about the rotational axis DA with respect to the towing vehicle coupling 60, in particular the coupling element 61, for example. Both adjustment elements 31, 32 are preferably mounted for rotation about the rotational axis DA, however.

The adjustment element 31 is for example mounted directly at an adjustment element bearing 35 for rotation about the rotational axis DA. The adjustment element 31 forms a pivot bearing or a bearing receptacle for the other adjustment element 32 located in its interior. The adjustment element 32 is for example not mounted rotatably at the adjustment element bearing 35 or not in engagement with the adjustment element bearing 35. It is also possible, however, that both adjustment elements 31, 32 are mounted rotatably at the adjustment element bearing 35, or that the adjustment element 32 located radially inwards with respect to the rotational axis DA is mounted at the adjustment element bearing 35 for rotation about the rotational axis DA and the radially outer adjustment element 31 is rotatably mounted not at the adjustment element bearing 35, but at the inner adjustment element 32.

The adjustment elements 31, 32 have circumferential walls 31A, 32A extending in an annular fashion around the rotational axis DA.

In the circumferential walls 31A, 32A through-openings 33D, 34D, at which the adjustment contours 33, 34 are located, are provided.

Figure 2:
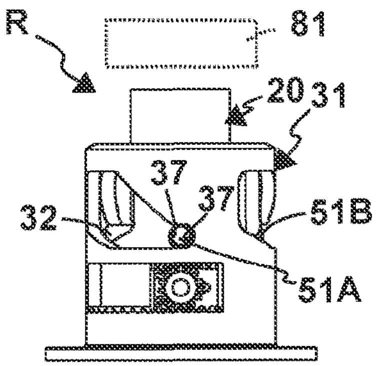
FIG. 2 shows the sensor apparatus according to FIG. 1 in a side view with its driver in idle position.
Figure 3:
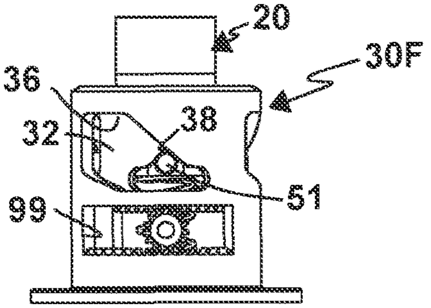
FIG. 3 shows the sensor apparatus according to FIG. 2 on a first movement section towards the working position of the driver.
Figure 6:
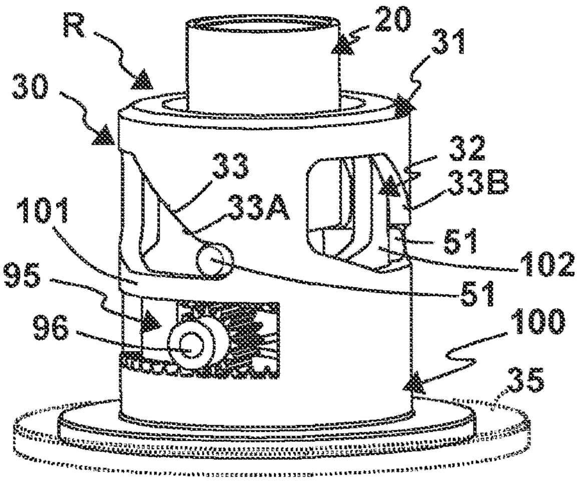
FIG. 6 shows a perspective oblique view of the sensor apparatus according to FIG. 2.

Each adjustment contour 33, 34 has an idle position holding receptacle 37 in its end region assigned to the idle position R. In a relative position of the adjustment elements 31, 32 which is assigned to the idle position R, the idle position holding receptacles 37 are opposite each other and form a reception chamber in which a respective adjustment body 51 guided at the respective adjustment contour 33, 34 is held non-rotatably with respect to the rotational axis DA. At each idle position holding receptacle 37, in particular its base or end region, an idle position stop 37A is provided, for example. This position is shown in FIGS. 2 and 6.

The adjustment elements 31, 32 are coupled to each other by an actuating gear mechanism 95. A gear wheel 96 meshes with actuating contours 97, 98 of the adjustment elements 31, 32, for example.

The actuating contours 97, 98 are for example provided at through-openings 39 extending in an annular fashion around the rotational axis DA. The actuating contours 97, 98 extend in the circumferential direction around the rotational axis DA on the respective longitudinal narrow sides of the through-openings 39 in the respective circumferential walls 31A, 32A of the adjustment elements 31, 32. The actuating contours 97, 98 comprise or are designed as toothings, for example.

At this point it should be mentioned that the actuating contours 97, 98 can also be designed as plane contours, for example, which can be driven by the gear wheel 96 if the latter is designed as a friction wheel, for example.

The actuating contours 97, 98 are located opposite each other.

The gear wheel 96 is in engagement with one each of the actuating contours 97, 98 on mutually opposite sides.

In the end regions of the actuating contours 97, 98 end stops 99 are preferably provided, which the gear wheel 96 can hit.

It is advantageous if the drive motor 55A switches off on reaching a respective end stop 99, for example if a working current provided for the operation of the drive motor 55A exceeds a predetermined threshold.

Alternatively or in addition it is also possible, however, that the drive motor 55A switches off before and/or at reaching the end stop 99. At least one sensor can be provided for this, for example, e.g. a position sensor detecting a respective position of the adjustment element 31 and/or the adjustment element 32 and/or a sensor detecting the rotations of the drive 55C.

As a result of this configuration a rotation of the gear wheel 96 causes mutually opposed and/or counter-rotating movements of the adjustment elements 31, 32, wherein, for example when the driver 20 is moved from the idle position R into the working position AS, the adjustment element 31 rotates in one rotational direction DG, e.g. anticlockwise, and the other adjustment element 32 rotates in an opposite rotational direction DU, e.g. clockwise, about the rotational axis DA. When the driver 20 is moved from the working position AS towards the idle position R, the adjustment element 31 rotates in the rotational direction DU and the adjustment element 32 rotates inversely in the rotational direction DG The gear wheel 96 could for example be provided at a bearing 96L arranged to be stationary with respect to the towing vehicle coupling 60. The adjustment elements 31, 32 rotate past said bearing 96L. The bearing 96L is indicated in FIG. 1 in the form of the drive motor 55A, which can for example rotate freely if one of the adjustment elements 31, 32 is actuated manually and the drive motor 55A is not energised.

The gear wheel 96 can also be represented by the drive pinion 55D of the drive motor 55A or the gear mechanism 55B. The drive pinion 55D meshes with the actuating contours 97, 98.

The support 50 is loaded towards the working position AS by the spring assembly 53. If the adjustment elements 31, 32 are actuated to move the driver 20 towards the working position AS by the drive motor 55A or another working force acting on one of the adjustment elements 31, 32 or on the gear wheel 96, the adjustment contours 33, 34 are actuated to move away from each other, wherein each adjustment body 51 is held between mutually opposite adjustment contours 33 and 34. Together these form a holding receptacle 33, for example a V-shaped holding receptacle, in which the adjustment body 51 is held non-rotatably with respect to the adjustment path VS.

From the support 50, there project several adjustment bodies 51, e.g. adjustment bodies 51A, 51B, 51C, which have an angular distance, in particular identical angular distances, with respect to the rotational axis DA and/or the adjustment path VS. The adjustment bodies 51 are arranged at angular distances of 60°, for example. In the same way and accordingly at the same angular distances as the adjustment bodies 51, three pairings of adjustment contours 33, 34, i.e. adjustment contours 33A, 34A 33B, 34B and 33C, 34C, are provided at the adjustment elements 31, 32, with which adjustment contours the adjustment bodies 51A, 51B, 51C are in engagement. As a result the support 50 is guided between the working position AS and the idle position R so as to be non-tiltable and/or non-pivotable with respect to the adjustment path VS and/or the rotational axis DA.

It is self-evident that only one of the adjustment bodies 51A, 51B, 51C or two of the adjustment bodies 51A, 51B, 51C or further adjustment bodies 51, e.g. four or five adjustment bodies, can also be provided, for example. At least one or several or all of the adjustment bodies is or are preferably in engagement with a pairing of adjustment contours 33, 34.

Figure 4:
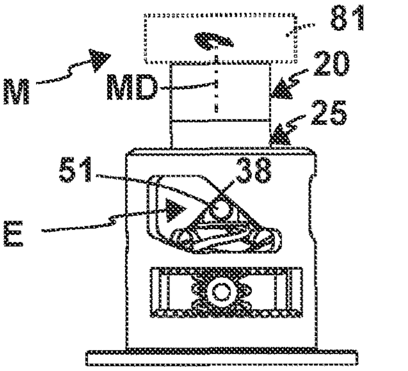
FIG. 4 shows the sensor apparatus according to FIGS. 2, 3, the driver having moved farther towards the working position.
Figure 7:
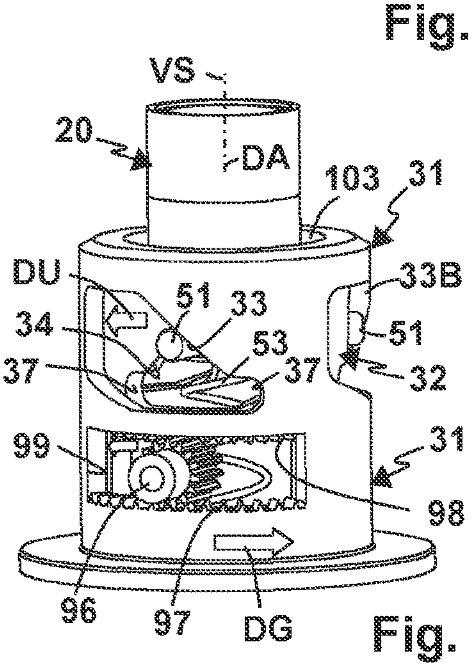
FIG. 7 shows the sensor apparatus according to FIG. 6, approximately in the position corresponding to FIG. 4.

As long as the adjustment bodies 51A, 51B, 51C are in engagement with their respectively assigned adjustment contours 33A, 34A 33B, 34B and 33C, 34C, they have an engagement position E. As shown in FIGS. 4 and 7, this engagement position E is maintained until the adjustment elements 31, 32 have a relative position assigned to the working position AS of the driver 20.

Figure 5:
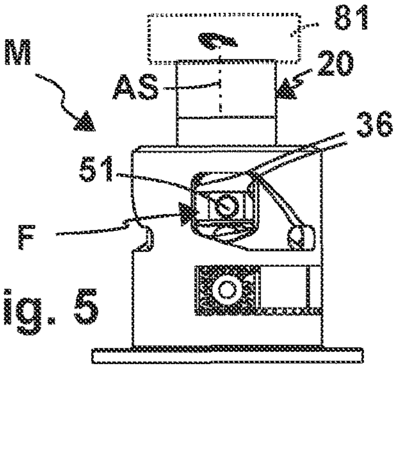
FIG. 5 shows the sensor apparatus according to FIGS. 2 to 4, the driver having moved into the working position.
Figure 8:
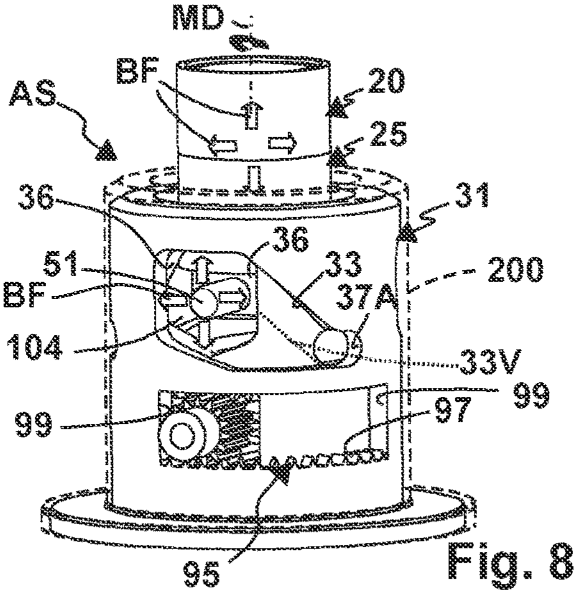
FIG. 8 shows the sensor apparatus according to FIGS. 6, 7 in the position corresponding to FIG. 5.

The adjustment elements 31, 32 then continue to rotate into a release position F (FIGS. 5 and 8), in which the adjustment bodies 51A, 51B, 51C enter movement recesses 36 adjacent to the adjustment contours 33A, 34A 33B, 34B and 33C, 34C. A movement recess 36 is provided adjacent to each of the adjustment contours 33A, 34A 33B, 34B and 33C, 34C, wherein the movement recesses lie opposite one another in pairs in the release position F in such a way that a kind of window or movement opening is formed in which the respective adjustment bodies are movable with respect to the coupling element 61 with the degrees of freedom of movement BF provided by the retaining device 40, which differ from the rotatability about the drive rotational axis MD. The driver 20 is accordingly mounted with the degrees of freedom of movement BF as well.

At this point it should be noted that these degrees of freedom of movement can be restricted insofar as the adjustment body 51 can hit the edge region of the movement recess 36 if the driver 20 is correspondingly far deflected with respect to the adjustment device 30 with a degree of freedom of movement which is different from the drive rotational axis MD. In practice, however, i.e. at a trailer operation of the towing vehicle coupling 60 and/or contact of the mating coupling element 81 with the driver 20 during a travelling operation of the towing vehicle Z, such excessive deflections do not occur.

The adjustment bodies 51A, 51B can be parts of the mounting device 41A, for example shaft elements or shaft bodies, e.g. one of the shaft bodies 48. The adjustment body 51C, on the other hand, does not form a part of the mounting device 41A.

In FIGS. 9-12 an alternative manual actuating concept is shown in an adjustment device 30A of a sensor apparatus 10A. The sensor apparatus 10A is substantially identical with the sensor apparatus 10, a manual actuation being provided.

Figure 9:
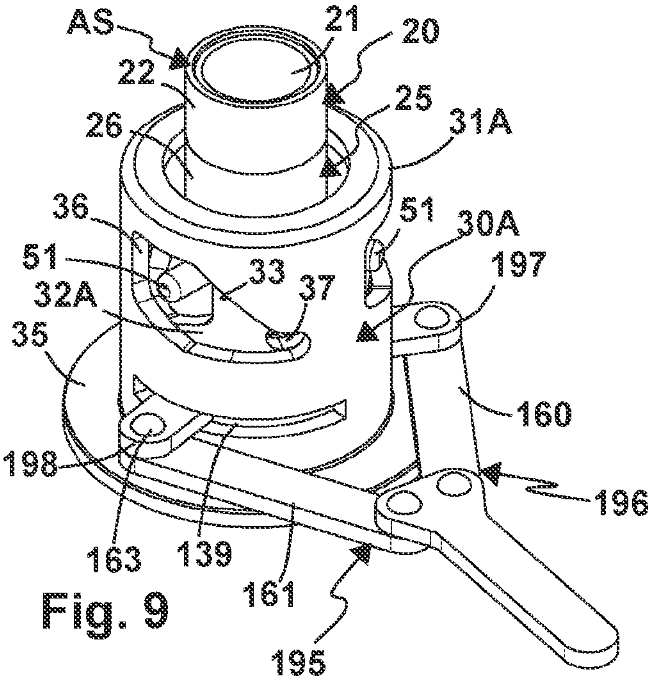
FIG. 9 shows a variant of the sensor apparatus according to the preceding figures with a manual actuation at an angle from above.
Figure 10:
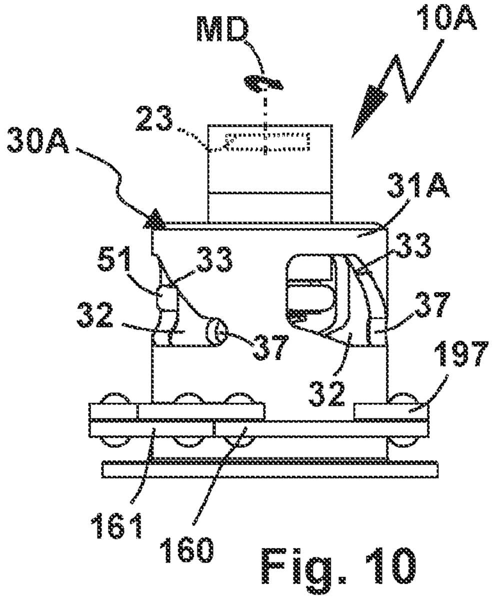
FIG. 10 shows the sensor apparatus from FIG. 9 in a side view.
Figure 11:
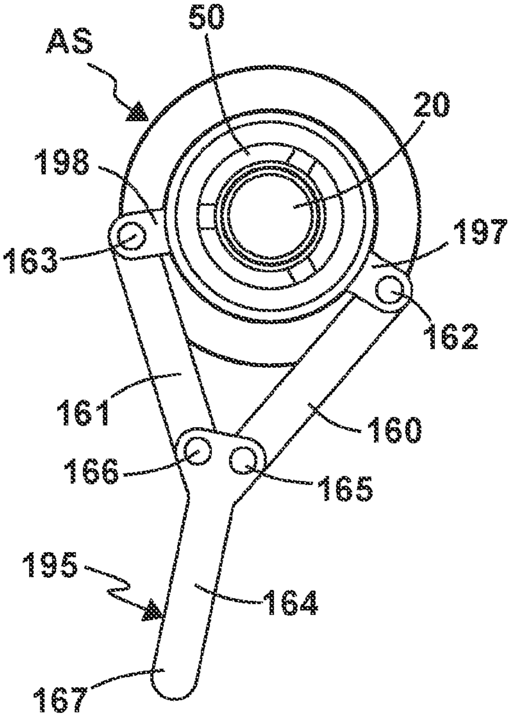
FIG. 11 shows the sensor apparatus according to FIGS. 9, 10 from above with its driver in working position.
Figure 12:
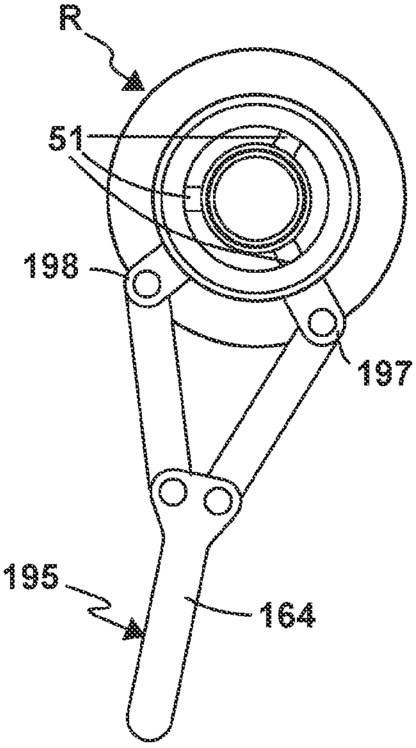
FIG. 12 shows the sensor apparatus according to FIG. 11, but with the driver moved into the idle position.

The adjustment device 30A has adjustment elements 31A, 32A, which are basically identical with the elements 31, 32. The adjustment element 31A is stationary with respect to the towing vehicle coupling 60, however, while the adjust adjustment element 32A can pivot with respect to the adjustment element 31A about a rotational axis DA. For this purpose the adjustment element 32A is mounted pivotably or rotatably in or at the adjustment element 31A, wherein the adjustment element bearing 35 described above can easily provide a swivel bearing or pivot bearing for the adjustment element 32A, which is indicated in FIG. 9.

An actuating gear mechanism 195 is provided for actuating the adjustment device 30A. The actuating gear mechanism 195 comprises a deflecting linkage 196, for example.

An actuating contour 197 is connected to the adjustment element 31A, while an actuating contour 198 is connected to the adjustment element 32A. The actuating contours 197, 198 are used for actuating the actuating gear mechanism 195 and are for example represented by projections which project radially in front of the adjustment elements 31A, 32A. The actuating contour 198 for example projects through a through-opening 139 of the adjustment element 31A in a radially outward direction in front of the adjustment element 31A.

At the actuating contours or actuating projections 197, 198, actuating arms 160, 161 are pivotably mounted by means of swivel bearings 162, 163. The actuating arms 160, 161 can be driven by a drive arm 164. The actuating arms 160, 161 are pivotably joined to the drive arm 164 by means of swivel bearings 165, 166. The swivel bearings 165, 166 are provided in a longitudinal end region of the drive arm 164, while the other longitudinal end region or main section of the drive arm 164 advantageously provides a handle 167.

By pulling the drive arm 164, for example from a position assigned to the working position AS away from the adjustment device 30A or the adjustment bodies 31A, 32A, the adjustment device 30A can be moved from the position assigned to the working position AS into a position assigned to the idle position R. In this process the drive arm 164 is as it were supported on the actuating contour 197, which forms an abutment for the deflecting linkage 196. As a result the drive arm 164 can apply a tensile force to the actuating contour 198 and thus to the adjustment element 32A via the actuating arm 161, whereby the adjustment element 32A is rotated or pivoted about the rotational axis DA relative to the adjustment element 31A. The adjustment contours 33, 34 then act to move the driver 20 from the working position AS towards the idle position R.

The sensor apparatus 10A for example has the retaining device 40, which is only shown in the form of the adjustment bodies 51 in the drawing, however, whereas the mounting device 40A is not shown.

Figure 14:
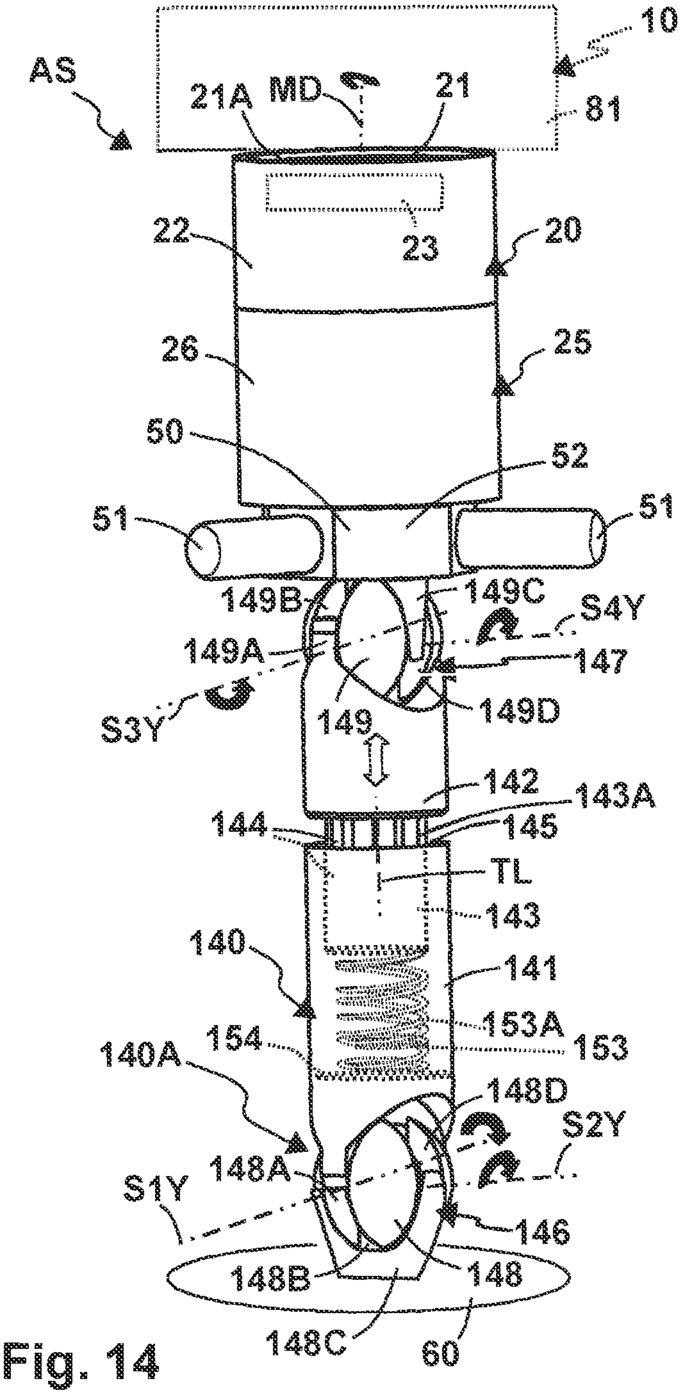
FIG. 14 shows a sensor apparatus with an alternative retaining device.
Figure 15:
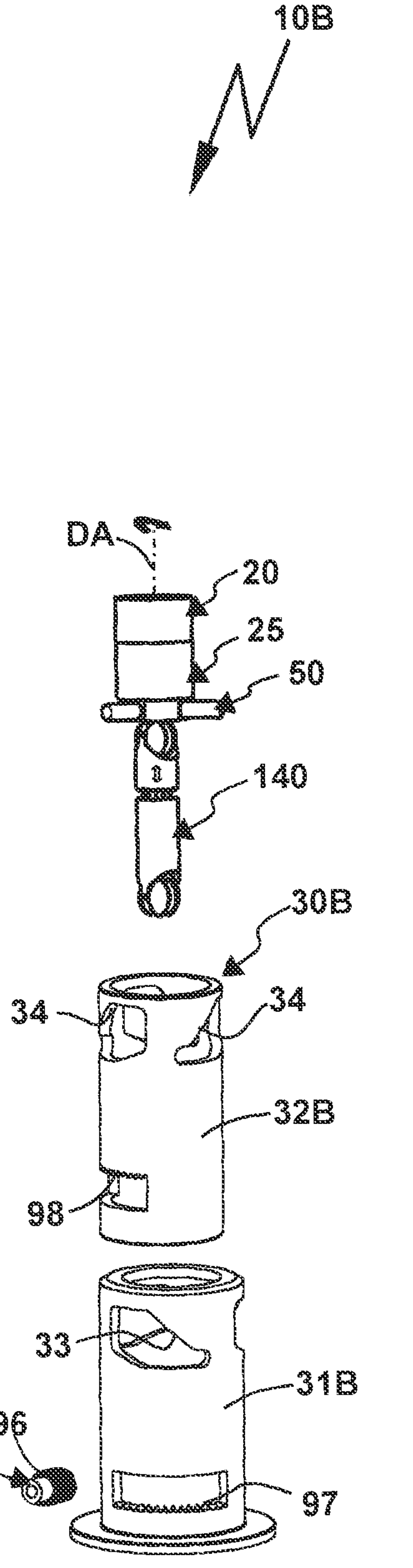
FIG. 15 shows the sensor apparatus according to FIG. 14 in an exploded view and with an adjustment device.
Figure 18:
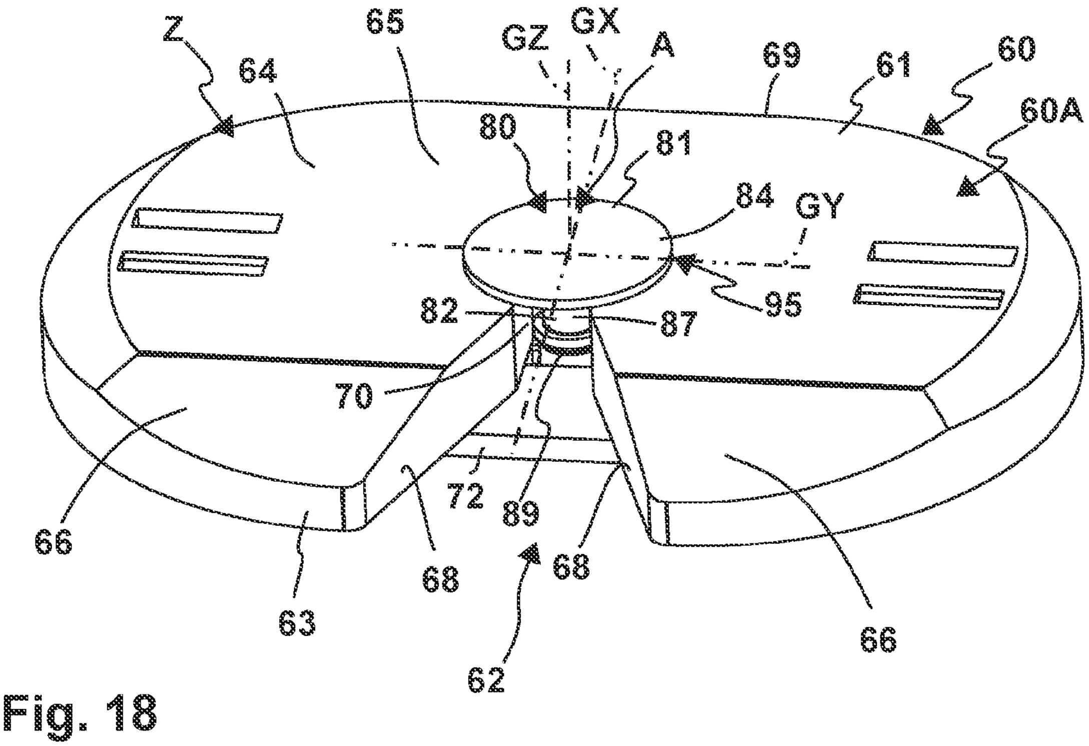
FIG. 18 shows a perspective oblique view of a towing vehicle coupling at an angle from above with a sensor apparatus according to the preceding figures at an angle from above, wherein a trailer coupling is coupled to the towing vehicle coupling.
Figure 19:
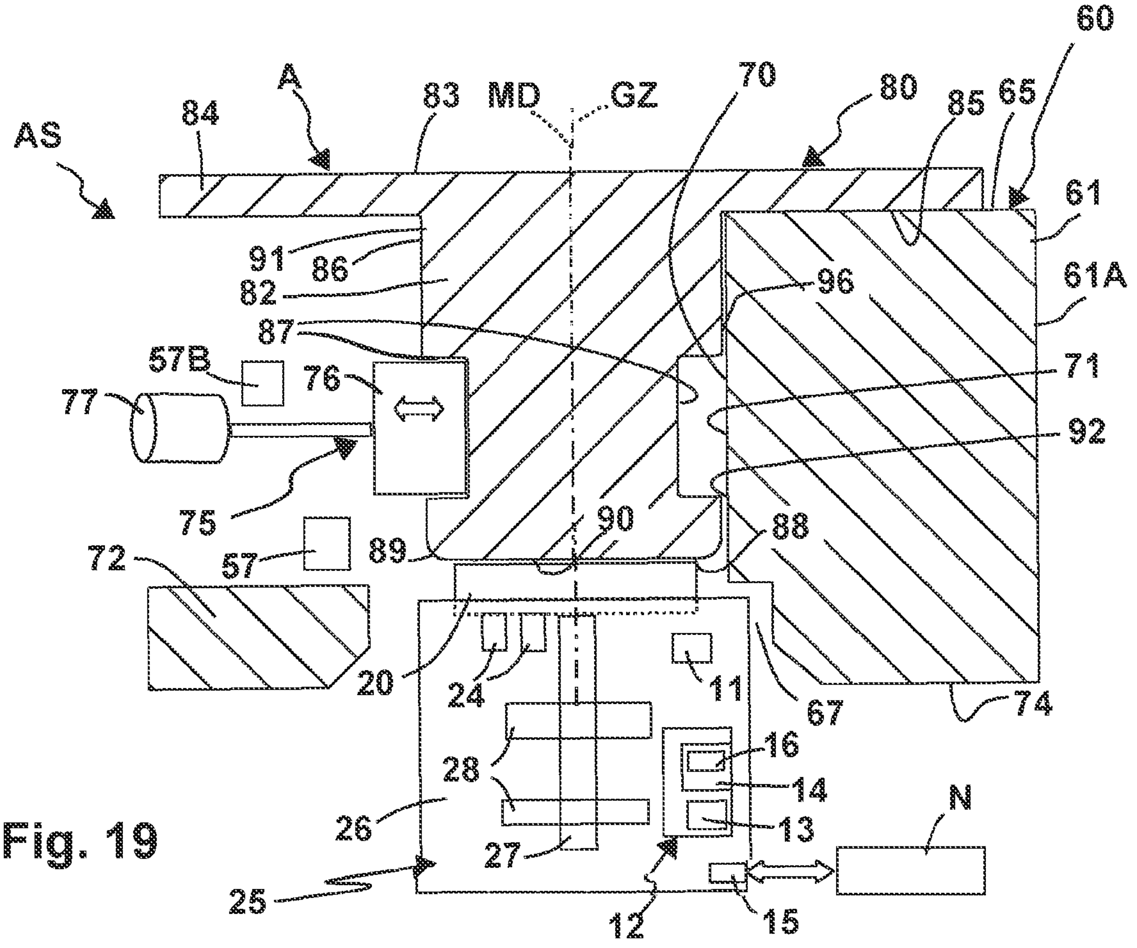
FIG. 19 shows a sectional view through the towing vehicle coupling and the trailer coupling as well as a driver of the sensor apparatus according to the preceding figures.

A retaining device 140 of a sensor apparatus 10B as shown in FIG. 14 and FIG. 15 could easily be provided in the sensor apparatus 10 and/or 10A as well, however.

The retaining device 140 is particularly suitable for integration into an adjustment device, e.g. an adjustment device 30B, which is substantially identical with the adjustment device 30 but has longer or more elongated adjustment elements 31B, 32B with respect to the rotational axis DA, which are otherwise identical with the adjustment elements 31, 32, for example having the actuating contours 97, 98 for the actuating gear mechanism 95, with which the gear wheel 96 is in engagement. In addition, the adjustment contours 33, 34 for the adjustment bodies 51, which are located at the support 52, are provided.

In the sensor apparatus 10B the support 52 is mounted movably with respect to degrees of freedom of movement BF, which are different from the rotatability about the drive rotational axis MD and provided and suitable for providing the drive-coupling of the driver 20 with respect to the mating coupling element 81.

The mounting device 140A has bearing parts 141, 142, which are displaceable relative to each other with respect to a sliding axis TL by means of a sliding bearing 143. The sliding axis TL is preferably parallel to the drive rotational axis MD or inclined thereto by a small angle. A bearing projection 144 of the one bearing part 142 engages with a bearing receptacle 156 of the other bearing part 141, for example, and is there accommodated so as to be displaceable with respect to the sliding axis TL.

The bearing parts 141, 142 are loaded away from each other by a spring assembly 153. The spring assembly 153 for example comprises a compression spring 153A supported at the bearing parts 141, 142. The compression spring 153A is accommodated in the bearing receptacle 145, for example, and acts on that section of the bearing projection 144 which engages with the bearing receptacle 145.

The bearing parts 141, 142 have gimballed bearings or gimbal bearings 146, 147 in the end regions averted from the sliding bearing 143. One of the gimballed bearings 146 is or can be located in a stationary position with respect to the towing vehicle coupling 60, while the other gimballed bearing 147 is supported at the support 50. The gimbal bearings 146, 147 form swivel bearing assemblies 146A, 147A, the pivot axes of which extend at an angle, in particular at right angles, to each other. Instead of a respective gimbal bearing 146, 147, swivel bearings arranged next to each other or in a row could also be provided.

The gimbal bearings 146, 147 have bearing bodies 148, 149, for example spherical bearing bodies. At their outer circumference the bearing bodies 148, 149 have bearing receptacles 148B, 148D or 149B and 149D, with which the bearing elements 148A, 148C, 149A, 149C engage. The bearing elements 148A, 148C, 149A, 149C are designed in the manner of bearing clasps or bearing claws, for example, and engage with the bearing receptacles 148B, 148D, 149B and 149D, which are designed as slots or circumferential grooves, for example.

The bearing element 148C is for example located so as to be stationary with respect to the towing vehicle coupling 60. The bearing element 149C is for example located at the support 50, e.g. at the support plate 52 on the side averted from the driver 20.

The gimbal gearing 146 has pivot axes S1Y, S2Y extending at an angle, for example at right angles, to the drive rotational axis MD.

The other gimbal gearing 147 has pivot axes S3Y, S4Y likewise extending at an angle, for example at right angles, to the drive rotational axis MD.

The pivot axes S1Y, S2Y, S3Y and S4Y form rotational degrees of freedom of movement which differ from pivot axes S1Y, S2Y and are provided and suitable for providing or maintaining the motion coupling between the driver 20 and the mating coupling element 81.

In addition the mounting device 140A has a degree of freedom of translational movement along the sliding axis TL.

This degree of freedom of translational movement and/or the rotational degrees of freedom of movement, provided by the pivotability about the pivot axes S1Y, S2Y, S3Y and S4Y, form or make available the degrees of freedom of movement BF.

Like the adjustment bodies 31, 32, the adjustment bodies 31B, 32B can form a housing 100, which accommodates components of a retaining device and/or a driver mounting device and/or the driver at least in the idle position R.

The adjustment element 31 for example forms an outer housing body 101, in which the adjustment element 32 is accommodated. The adjustment element 32 can also form a housing body, namely an inner housing body 102. The housing 100, e.g. the housing bodies 101, 102, bound(s) an interior 104, in which the retaining device 140 can be accommodated as a whole, for example. The housing 101 has a through-opening 103, through which the driver 20 projects in front of the housing 101 in the working position AS. In the idle position R the driver 20 is moved closer to the housing 101, so that the driver mounting device 25 and preferably a portion of the driver 20 as well dip into the housing 101.

At this point it should be mentioned that there may be kinematics in which the driver 20 projects not at all or less far in front of the housing 101 in the idle position R, for example if the adjustment contours 33, 34 were to extend farther towards the adjustment element bearing 35.

The adjustment contours 33, 34 act as resetting contours for moving the driver 20 from the working position AS into the idle position R. An adjustment contour in the form of a drive contour is easily possible as well, as indicated diagrammatically in FIG. 8, for example. The adjustment contour 33 can for example be located opposite a drive contour 33V, so that the two contours 33 and 33V form a guide link, in particular a guide groove or a guide slot. The adjustment body 51 engaging between the contours 33, 33V is actuated towards the working position AS by the drive contour 33V at a relative movement of the adjustment elements 31, 32 from a position assigned to the idle position R into a position assigned to the working position AS (according to FIGS. 2 and 6). In this case the spring assembly 51 is not required or can have a lower spring force. In this configuration the magnet assembly with the magnet 23 can be sufficient to hold the driver 20 non-rotatably at the mating coupling element 81 with respect to the drive rotational axis MD.

Figure 16:
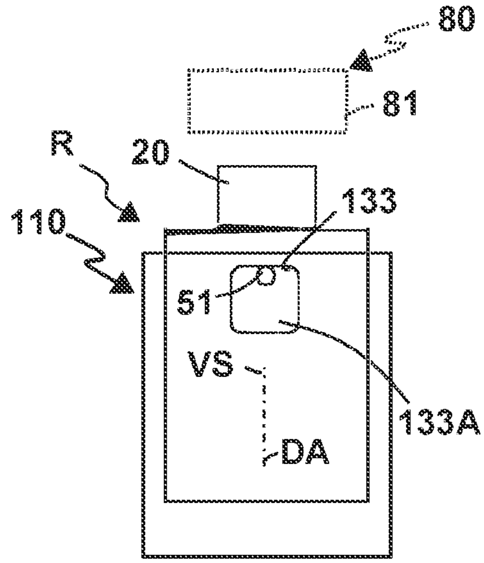
FIG. 16 shows a further sensor apparatus with an adjustment device in idle position.
Figure 17:
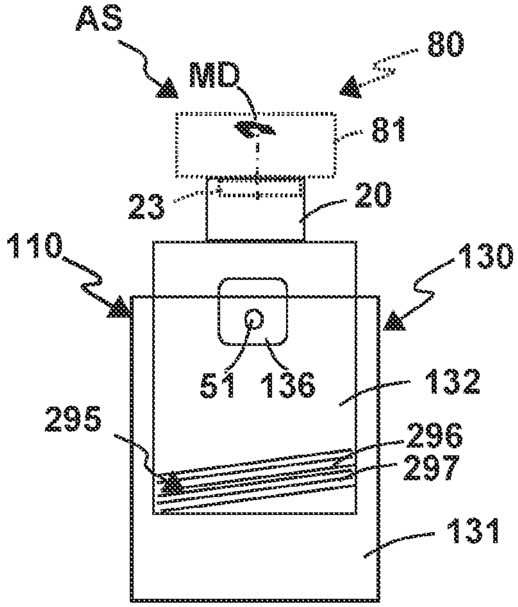
FIG. 17 shows the sensor apparatus according to FIG. 16, but in working position.

In a sensor apparatus 110 according to FIGS. 16 and 17, an adjustment device 130 with adjustment elements 131, 132 is provided.

The adjustment elements 131, 132 can be designed as disc bodies or wall bodies, for example. It is preferred, however, if the adjustment elements 131, 132 are designed as tubular bodies or sleeve bodies, similar to the adjustment elements 31, 32. The adjustment elements 131, 132 are for example rotatable relative to each other, in particular about a rotational axis DA.

The adjustment element 132 is mounted so as to be movable, e.g. displaceable, along an adjustment path VS with respect to the adjustment element 131. It is for example possible that the adjustment elements 131, 132 are motion-coupled to each other by means of an actuating gear mechanism 295. The actuating gear mechanism 295 has for example mutually engaging, diagrammatically indicated screw contours 296, 297 of the adjustment elements 131, 132, so that the adjustment element 132 is moved along the adjustment path VS, for example at a rotation of the adjustment element 131 about a rotational axis DA.

An adjustment contour 133, for example in the manner of a recess or slot 133A, is located at the adjustment element 132. One of the adjustment bodies 51 engages with the adjustment contour 133 or slot 133A.

It is advantageous if at least two, preferably three or further, adjustment contours 133, with each of which an adjustment body 51 engages, are provided at angular distances with respect to the rotational axis DA.

If the adjustment element 132 is in the position assigned to the idle position R, the adjustment body 51 is supported at the adjustment contour 133, so that the driver 20 cannot come into contact with the mating coupling element 81. If the adjustment element 132 is moved into the position assigned to the working position AS (FIG. 17), however, the adjustment contour 133 comes out of engagement with the adjustment body 51, which is then in an inner or central region of the recess or slot 133A, i.e. in a movement recess 136, for example. The adjustment body 51 is for example located at an already described retaining device 40 or 140. The adjustment body 51 is distanced from the adjustment device 130 in the working position AS, so that the driver 20 is movable relative to the adjustment device 130 with the degrees of freedom of movement BF, in order to maintain the contact with the mating coupling element 81. This contact is for example provided by the spring assembly 53 and/or by the magnet 23.

It is advantageous if the sensor apparatus 10, 10A 110 as a whole or a part thereof, e.g. the adjustment device 30, 130, is located in a protective housing, for example a protective housing 200. The protective housing 200 is designed in the manner of a protective hood, for example. The protective housing 200 is preferably yielding in the direction of the drive rotational axis, for example telescopic, elastically resilient or the like.

In FIG. 13 a further configuration of a protective housing in the form of a protective housing 300 is indicated. The sensor apparatus 10, e.g. the adjustment device 30 and/or the mounting device 40A and/or the retaining device 40 and/or the actuating drive 55, for example the drive motor 55A, can be located in the protective housing 300. The protective housing 300 preferably has a recess 301, through which the mating coupling element 81 can come into engagement with the driver 20. The protective housing 300 is indicated diagrammatically. The protective housing 300 is for example designed as a metallic housing, a plastic housing or the like. The protective housing 300 can also be designed in the manner of a module which comprises the sensor apparatus 10 and can be mounted at the towing vehicle coupling 60.

The invention claimed is:

1. A sensor apparatus for a towing vehicle coupling, or as a component of a towing vehicle coupling, by means of which a trailer vehicle can be coupled to a towing vehicle, the towing vehicle coupling having a coupling element for releasable coupling of a mating coupling element, the apparatus comprising:

a driver mounted on a driver mounting device so as to be rotatable about a drive rotational axis relative to the coupling element, the driver being rotationally drivable by the mating coupling element upon rotation about at least one coupling joint rotational axis to detect rotation of the mating coupling element;

a sensor configured to detect a rotational position of the driver relative to the driver mounting device;

a retaining device configured to retain the driver mounting device non-rotatably relative to the coupling element with respect to the drive rotational axis; and an adjustment device having at least one adjustment element configured to move or guide the driver between a working position closer to the mating coupling element and an idle position farther away, wherein the adjustment device is not in engagement with the retaining device in the working position so that the retaining device can move relative to the coupling element with at least one non-rotational degree of freedom comprising at least one linear degree of freedom and/or at least one rotational degree of freedom about an axis transverse to the drive rotational axis suitable for enabling or maintaining drive coupling of the driver with the mating coupling element.

2. The sensor apparatus of claim 1, wherein the retaining device mounts the driver mounting device relative to the coupling element with the at least one degree of freedom suitable for providing and maintaining drive coupling of the driver with the mating coupling element.

3. The sensor apparatus of claim 1, wherein the driver is biased into the working position by a spring assembly acting on the retaining device.

4. The sensor apparatus of claim 1, further comprising at least one adjustment body joined to the driver or the retaining device and engageable with an adjustment contour of the at least one adjustment element for moving the driver between the working and idle positions.

5. The sensor apparatus of claim 1, wherein the sensor apparatus includes at least two adjustment bodies, each engageable with an adjustment contour of the at least one adjustment element when moving between the idle and working positions, the adjustment bodies being angularly spaced from one another.

6. The sensor apparatus of claim 1, wherein the sensor apparatus includes two or three adjustment bodies, each engageable with an adjustment contour of the at least one adjustment element such that the driver is supported non-pivotably relative to an adjustment path or adjustment axis along which the driver is movable by the adjustment device between the working and idle positions.

7. The sensor apparatus of claim 1, wherein the at least one adjustment element is mounted at an adjustment element bearing stationary relative to the coupling element so as to be rotatable about an axis that is coaxial with or parallel to the drive rotational axis, or inclined relative thereto by at most 10 degrees, and/or extends annularly around the axis.

8. The sensor apparatus of claim 1, wherein the at least one adjustment element comprises an adjustment contour including a resetting contour for moving the driver from the working position into the idle position and/or a drive contour for moving the driver from the idle position into the working position.

9. The sensor apparatus of claim 4, wherein the adjustment device includes a movement recess in which the adjustment body of the retaining device engages freely with the degree of freedom provided for drive coupling with the mating coupling element in a position of the at least one adjustment element assigned to the working position.

10. The sensor apparatus of claim 4, wherein the at least one adjustment element is movable, when the driver is in the working position, between a release position in which the adjustment body is out of engagement with an adjustment contour of the at least one adjustment element and an engagement position in which the adjustment body engages the adjustment contour.

11. The sensor apparatus of claim 4, wherein the at least one adjustment element includes an idle-position holding receptacle in which the adjustment body is held stationary in a position assigned to the idle position, and/or an idle-position stop engaged by the adjustment body in the idle position.

12. The sensor apparatus of claim 4, wherein the at least one adjustment element includes two adjustment elements each having an adjustment contour, the two adjustment elements being movable relative to each other and the adjustment body engaging the adjustment contours for movement between the working and idle positions.

13. The sensor apparatus of claim 12, wherein the adjustment contours are configured to guide the adjustment body along an adjustment path by transverse adjustment of the two adjustment elements, and inclinations of the adjustment contours prevent movement of the adjustment body transverse to the adjustment path.

14. The sensor apparatus of claim 12, wherein the adjustment contours form a holding receptacle for holding the adjustment body, the receptacle being movable between a position assigned to the working position and a position assigned to the idle position along a substantially straight adjustment path.

15. The sensor apparatus of claim 12, wherein the two adjustment elements include idle-position stops between which the adjustment body is held stationary in a position assigned to the idle position.

16. The sensor apparatus of claim 1, further comprising a drive motor configured to drive the at least one adjustment element.

17. The sensor apparatus of claim 16, further comprising a control device configured to activate the adjustment device, including the drive motor.

18. The sensor apparatus of claim 1, wherein the at least one adjustment element includes a through-opening for a drive element configured to drive another adjustment element of the adjustment device.

19. The sensor apparatus of claim 18, wherein a drive contour is located at the through-opening such that the drive element can drive the at least one adjustment element having the through-opening and an adjacent adjustment element.

20. The sensor apparatus of claim 12, wherein the two adjustment elements are motion-coupled by an actuating gear mechanism for relative adjustment in opposite pivoting directions.

21. The sensor apparatus of claim 20, wherein the actuating gear mechanism includes a gear wheel in actuating engagement with actuating contours of the respective adjustment elements such that rotation of the gear wheel drives the two adjustment elements in opposite directions.

22. The sensor apparatus of claim 20, wherein the actuating gear mechanism includes a deflecting linkage having actuating arms pivotable with the two adjustment elements and joined to a drive arm such that pushing or pulling the drive arm adjusts the two adjustment elements relative to one another.

23. The sensor apparatus of claim 4, wherein the adjustment contour forms part of a deflection gear mechanism such that the adjustment contour moves or guides the adjustment body at rotational actuation of the at least one adjustment element in a linear manner or with a linear component parallel to its rotational axis.

24. The sensor apparatus of claim 1, wherein the adjustment device includes two tubular or sleeve-shaped adjustment elements that extend annularly around a central axis and engage with one another, or one adjustment element accommodates the other.

25. The sensor apparatus of claim 24, wherein at least one or both adjustment elements are rotatable about a common central axis or a common rotational axis relative to the coupling element.

26. The sensor apparatus of claim 1, wherein the at least one adjustment element forms part of a housing that at least partially accommodates the retaining device, and/or the adjustment device forms a housing for a support of the retaining device carrying the driver mounting device.

27. The sensor apparatus of claim 26, wherein the housing includes a through-opening through which the driver, the driver mounting device, or the retaining device projects at least partially in the working position.

28. The sensor apparatus of claim 1, wherein the driver is mounted relative to the coupling element with at least one non-rotational degree of freedom by a mounting device arranged to be stationary relative to the towing vehicle coupling to provide or maintain drive coupling with the mating coupling element, the mounting device having sliding bearing parts biased apart by a spring assembly and/or swivel-bearing assemblies providing pivotability about two axes transverse to the drive rotational axis.

29. The sensor apparatus of claim 1, further comprising a protective housing that at least partially accommodates the adjustment device and is elastic, telescoping, or longitudinally movable along a degree of freedom along which the driver is movable between the idle and working positions.

30. The sensor apparatus of claim 1, wherein the towing vehicle coupling is a semitrailer coupling having a coupling receptacle for accommodating a king pin of the mating coupling element, or the coupling element includes a coupling ball or coupling projection for engagement with a coupling receptacle of the mating coupling element.

31. A sensor apparatus for a towing vehicle coupling, comprising:

a driver mounted on a driver mounting device so as to be rotatable about a drive rotational axis;

a retaining device configured to hold the driver mounting device non-rotatably with respect to the drive rotational axis while permitting movement of the driver mounting device with at least one non-rotational degree of freedom including at least one linear degree of freedom and at least one rotational degree of freedom about an axis transverse to the drive rotational axis;

a sensor configured to detect rotation of the driver about the drive rotational axis; and an adjustment device configured to move the driver between an idle position and a working position, wherein in the working position the adjustment device is out of engagement with the retaining device such that the retaining device is freely movable with the at least one non-rotational degree of freedom to maintain surface contact between the driver and a mating coupling element during coupling-joint rotation.

32. A sensor apparatus for a towing vehicle coupling, comprising:

a driver rotatable about a drive rotational axis;

a retaining device carrying the driver;

at least one adjustment body coupled to the retaining device; and an adjustment device comprising first and second adjustment elements arranged coaxially about a central axis and housed within a housing that accommodates at least a portion of the retaining device, each adjustment element having an adjustment contour, the first and second adjustment elements being rotatable relative to each other such that:

(a) in an idle-position relative orientation, the adjustment contours form a holding receptacle that constrains the adjustment body to maintain the driver in the idle position; and (b) in a working-position relative orientation, the adjustment body enters a movement recess in the housing such that the adjustment device is out of engagement with the retaining device, permitting the retaining device to move with at least one non-rotational degree of freedom suitable for maintaining drive coupling of the driver with a mating coupling element.

* * * * *